United States Patent
Meylan et al.

(10) Patent No.: US 12,526,804 B2
(45) Date of Patent: Jan. 13, 2026

(54) TECHNIQUES FOR REDUCING LATENCY OF DATA IN THE PRESENCE OF SCHEDULED UPLINK TRANSMISSIONS

(71) Applicant: QUALCOMM Incorporated, San Diego, CA (US)

(72) Inventors: Arnaud Meylan, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 980 days.

(21) Appl. No.: 17/691,964

(22) Filed: Mar. 10, 2022

(65) Prior Publication Data

US 2023/0292321 A1    Sep. 14, 2023

(51) Int. Cl.
*H04W 72/21* (2023.01)

(52) U.S. Cl.
CPC .................................. *H04W 72/21* (2023.01)

(58) Field of Classification Search
USPC ........................................................ 370/329
See application file for complete search history.

(56) References Cited

U.S. PATENT DOCUMENTS

2014/0135027 A1    5/2014   Kodali et al.

OTHER PUBLICATIONS

International Search Report and Written Opinion—PCT/US2023/063217—ISA/EPO—May 30, 2023 (2104097WO).
LG Electronics Inc (Rapporteur): "Report of [Post109bis-e] [957] [V2X]: MAC issues (LG)", 3GPP TSG-RAN WG2 #110-e, R2-2005720, 3rd Generation Partnership Project (3GPP), Mobile Competence Centre, 650, Route Des Lucioles, F-06921 Sophia-Antipolis Cedex, France, vol. RAN WG2, No. Online, Jun. 1, 2020-Jun. 12, 2020, 97 Pages, May 29, 2020 (May 29, 2020), XP051892161, p. 4, lines 33-37.
OPPO: "Remaining Issues for Low-Latency Uplink Transmission", 3GPP TSG RAN WG1 Meeting #93, R1-1806846, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, 2 Pages, May 20, 2018 (May 20, 2018), XP051442046, sections 3, 4.

*Primary Examiner* — Angel T Brockman
(74) *Attorney, Agent, or Firm* — Holland & Hart LLP

(57) ABSTRACT

Methods, systems, and devices for wireless communications are described. A wireless device such as a user equipment (UE) may receive a first control message that indicates a set of scheduled uplink communications, where the set of scheduled uplink communications include a set of transmission opportunities for transmitting one or more uplink messages. The UE may calculate a first duration between an availability of uplink data at the UE and a transmission opportunity of the set of transmission opportunities for transmitting the uplink data. The UE may then transmit a scheduling request for the uplink data based on the first duration being greater than a second duration, the second duration being either a duration between sending the scheduling request and receiving an uplink grant, or a latency threshold duration.

30 Claims, 16 Drawing Sheets

TECHNIQUES FOR REDUCING LATENCY OF DATA IN THE PRESENCE OF SCHEDULED UPLINK TRANSMISSIONS

FIELD OF TECHNOLOGY

The following relates to wireless communications, including techniques for reducing latency of data in the presence of scheduled uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some implementations, a UE may communicate using configured grants or dynamic grants to transmit uplink packets to the network.

SUMMARY

The described techniques relate to improved methods, systems, devices, and apparatuses that support techniques for reducing latency of data in the presence of scheduled uplink transmissions. For example, the described techniques provide support for applications at a user equipment (UE) or other wireless device that implements data transmissions (e.g., for ultra-reliable and low latency communication services) using grant-free uplink transmissions (e.g., pre-configured grants or semi-persistently scheduled uplink communications, which may be referred to as uplink configured grants or other like terminology), where the UE receives a configuration for a set of periodic uplink transmission opportunities for sending uplink data. In such cases, the UE may dynamically determine whether to use uplink resources associated with the configured grant or uplink resources associated with a scheduling request. In particular, the UE may transmit either a scheduling request (e.g., to obtain uplink resources) or the UE may wait until a next transmission opportunity associated with the uplink configured grant, which may be based on how quickly resources may be available after the arrival of uplink data (e.g., on a logical channel).

In some implementations, the UE may identify that uplink data has become available for transmission, and the UE may either send a scheduling request or use a transmission opportunity associated with the configured grant based on a latency calculation. For example, the UE may calculate a first duration between the availability of the uplink data and the next available transmission opportunity, and the UE may further calculate a second duration between the availability of the uplink data and a time when uplink resources may be available in response to a scheduling request. In such examples, the UE may transmit the scheduling request if the duration for waiting for the configured grant transmission opportunity is greater than the duration associated with sending the scheduling request and then being allocated uplink resources. In some other implementations, the UE may either send a scheduling request or use the configured grant transmission opportunity based on a delay threshold. For example, the UE may receive a delay threshold value for low-latency traffic and may send the scheduling request if the delay associated with waiting for the next configured grant transmission opportunity is greater than the latency threshold. In either case, the UE may dynamically determine the shortest delay in obtaining resources for transmitting the uplink data, thereby reducing latency for data transmissions.

A method for wireless communication at a UE is described. The method may include receiving a first control message indicating a set of scheduled uplink communications, the set of scheduled uplink communications including a set of transmission opportunities for transmitting one or more uplink messages, calculating a first duration between an availability of uplink data and a transmission opportunity of the set of transmission opportunities for transmitting the uplink data, and transmitting a scheduling request for the uplink data based on the first duration being greater than a second duration.

An apparatus for wireless communication at a UE is described. The apparatus may include a processor, memory coupled with the processor, and instructions stored in the memory. The instructions may be executable by the processor to cause the apparatus to receive a first control message indicating a set of scheduled uplink communications, the set of scheduled uplink communications including a set of transmission opportunities for transmitting one or more uplink messages, calculate a first duration between an availability of uplink data and a transmission opportunity of the set of transmission opportunities for transmitting the uplink data, and transmit a scheduling request for the uplink data based on the first duration being greater than a second duration.

Another apparatus for wireless communication at a UE is described. The apparatus may include means for receiving a first control message indicating a set of scheduled uplink communications, the set of scheduled uplink communications including a set of transmission opportunities for transmitting one or more uplink messages, means for calculating a first duration between an availability of uplink data and a transmission opportunity of the set of transmission opportunities for transmitting the uplink data, and means for transmitting a scheduling request for the uplink data based on the first duration being greater than a second duration.

A non-transitory computer-readable medium storing code for wireless communication at a UE is described. The code may include instructions executable by a processor to receive a first control message indicating a set of scheduled uplink communications, the set of scheduled uplink communications including a set of transmission opportunities for transmitting one or more uplink messages, calculate a first duration between an availability of uplink data and a transmission opportunity of the set of transmission opportunities for transmitting the uplink data, and transmit a scheduling request for the uplink data based on the first duration being greater than a second duration.

Some examples of the method, apparatuses, and non-transitory computer-readable medium described herein may further include operations, features, means, or instructions for calculating the second duration based on a duration between the availability of the uplink data and an availability of uplink resources granted in response to a scheduling request transmission.

In some examples of the method, apparatuses, and non-transitory computer-readable medium described herein, calculating the first duration may include operations, features, means, or instructions for calculating the first duration based on a first periodicity associated with the set of transmission opportunities, and where calculating the second duration includes and calculating the second duration based on a second periodicity associated with resources for transmitting the scheduling request.

In some examples of the method, apparatuses, and non-transitory computer-readable medium described herein, calculating the second duration may include operations, features, means, or instructions for calculating the second duration based on a duration between one or more previous scheduling request transmissions and respective uplink resources scheduled in response to each of the one or more previous scheduling request transmissions.

In some examples of the method, apparatuses, and non-transitory computer-readable medium described herein, the second duration may be based on an average duration between the one or more previous scheduling request transmissions and the respective uplink resources scheduled.

In some examples of the method, apparatuses, and non-transitory computer-readable medium described herein, the second duration includes a delay threshold associated with the uplink data.

Some examples of the method, apparatuses, and non-transitory computer-readable medium described herein may further include operations, features, means, or instructions for receiving a second control message indicating a configuration of the delay threshold.

In some examples of the method, apparatuses, and non-transitory computer-readable medium described herein, the delay threshold includes an upper bound for a latency of the uplink data.

In some examples of the method, apparatuses, and non-transitory computer-readable medium described herein, the set of scheduled uplink communications includes a set of semi-persistently scheduled uplink communications, a set of pre-scheduled uplink communications, or both.

Some examples of the method, apparatuses, and non-transitory computer-readable medium described herein may further include operations, features, means, or instructions for receiving an indication of a scheduling request mask configured for a logical channel corresponding to the uplink data and determining that the scheduling request may be configured for the logical channel corresponding to the uplink data, where the scheduling request may be transmitted based on the scheduling request being configured for the logical channel and the first duration being greater than the second duration.

Some examples of the method, apparatuses, and non-transitory computer-readable medium described herein may further include operations, features, means, or instructions for receiving an indication of a scheduling request mask configured for a first logical channel corresponding to the uplink data and determining that the scheduling request may be configured for a second logical channel different from the first logical channel corresponding to the uplink data, where the scheduling request may be transmitted based on the scheduling request being configured for the second logical channel and the first duration being greater than the second duration.

Some examples of the method, apparatuses, and non-transitory computer-readable medium described herein may further include operations, features, means, or instructions for receiving, in response to the scheduling request, downlink control information (DCI) scheduling uplink resources for the uplink data on a first logical channel, where receiving the DCI scheduling the uplink resources occurs prior to the transmission opportunity and transmitting the uplink data from the first logical channel using the uplink resources.

A method for wireless communication at a network entity is described. The method may include transmitting a first control message indicating a set of scheduled uplink communications, the set of scheduled uplink communications including a set of transmission opportunities for transmitting one or more uplink messages, receiving a scheduling request based on a first duration between an availability of uplink data and a transmission opportunity of the set of transmission opportunities being greater than a second duration, and transmitting, in response to the scheduling request, DCI scheduling uplink resources for the uplink data, where the transmission of the DCI scheduling the uplink resources occur prior to the transmission opportunity.

An apparatus for wireless communication at a network entity is described. The apparatus may include a processor, memory coupled with the processor, and instructions stored in the memory. The instructions may be executable by the processor to cause the apparatus to transmit a first control message indicating a set of scheduled uplink communications, the set of scheduled uplink communications including a set of transmission opportunities for transmitting one or more uplink messages, receive a scheduling request based on a first duration between an availability of uplink data and a transmission opportunity of the set of transmission opportunities being greater than a second duration, and transmit, in response to the scheduling request, DCI scheduling uplink resources for the uplink data, where the transmission of the DCI scheduling the uplink resources occur prior to the transmission opportunity.

Another apparatus for wireless communication at a network entity is described. The apparatus may include means for transmitting a first control message indicating a set of scheduled uplink communications, the set of scheduled uplink communications including a set of transmission opportunities for transmitting one or more uplink messages, means for receiving a scheduling request based on a first duration between an availability of uplink data and a transmission opportunity of the set of transmission opportunities being greater than a second duration, and means for transmitting, in response to the scheduling request, DCI scheduling uplink resources for the uplink data, where the transmission of the DCI scheduling the uplink resources occur prior to the transmission opportunity.

A non-transitory computer-readable medium storing code for wireless communication at a network entity is described. The code may include instructions executable by a processor to transmit a first control message indicating a set of scheduled uplink communications, the set of scheduled uplink communications including a set of transmission opportunities for transmitting one or more uplink messages, receive a scheduling request based on a first duration between an availability of uplink data and a transmission opportunity of the set of transmission opportunities being greater than a second duration, and transmit, in response to the scheduling request, DCI scheduling uplink resources for the uplink data, where the transmission of the DCI scheduling the uplink resources occur prior to the transmission opportunity.

In some examples of the method, apparatuses, and non-transitory computer-readable medium described herein, the second duration may be based on a duration between the availability of the uplink data and an availability of uplink resources granted in response to a scheduling request transmission.

In some examples of the method, apparatuses, and non-transitory computer-readable medium described herein, the first duration may be based on a first periodicity associated with the set of transmission opportunities and the second duration may be based on a second periodicity associated with resources for transmitting the scheduling request.

In some examples of the method, apparatuses, and non-transitory computer-readable medium described herein, the second duration may be based on a duration between one or more previous scheduling request transmissions and respective uplink resources scheduled in response to each of the one or more previous scheduling request transmissions.

In some examples of the method, apparatuses, and non-transitory computer-readable medium described herein, the second duration may be based on an average duration between the one or more previous scheduling request transmissions and the respective uplink resources scheduled.

In some examples of the method, apparatuses, and non-transitory computer-readable medium described herein, the second duration includes a delay threshold associated with the uplink data.

Some examples of the method, apparatuses, and non-transitory computer-readable medium described herein may further include operations, features, means, or instructions for transmitting a second control message indicating a configuration of the delay threshold.

In some examples of the method, apparatuses, and non-transitory computer-readable medium described herein, the delay threshold includes an upper bound for a latency of the uplink data.

In some examples of the method, apparatuses, and non-transitory computer-readable medium described herein, the set of scheduled uplink communications include a set of semi-persistently scheduled uplink communications, a set of pre-scheduled uplink communications, or both.

Some examples of the method, apparatuses, and non-transitory computer-readable medium described herein may further include operations, features, means, or instructions for transmitting an indication of a scheduling request mask configured for a logical channel corresponding to the uplink data, the scheduling request being configured for the logical channel corresponding to the uplink data, where the scheduling request may be received based on the scheduling request being configured for the logical channel and the first duration being greater than the second duration.

Some examples of the method, apparatuses, and non-transitory computer-readable medium described herein may further include operations, features, means, or instructions for transmitting an indication of a scheduling request mask configured for a first logical channel corresponding to the uplink data, the scheduling request being configured for a second logical channel different from the first logical channel corresponding to the uplink data, where the scheduling request may be received based on the scheduling request being configured for the second logical channel and the first duration being greater than the second duration.

DETAILED DESCRIPTION

Figure 1:
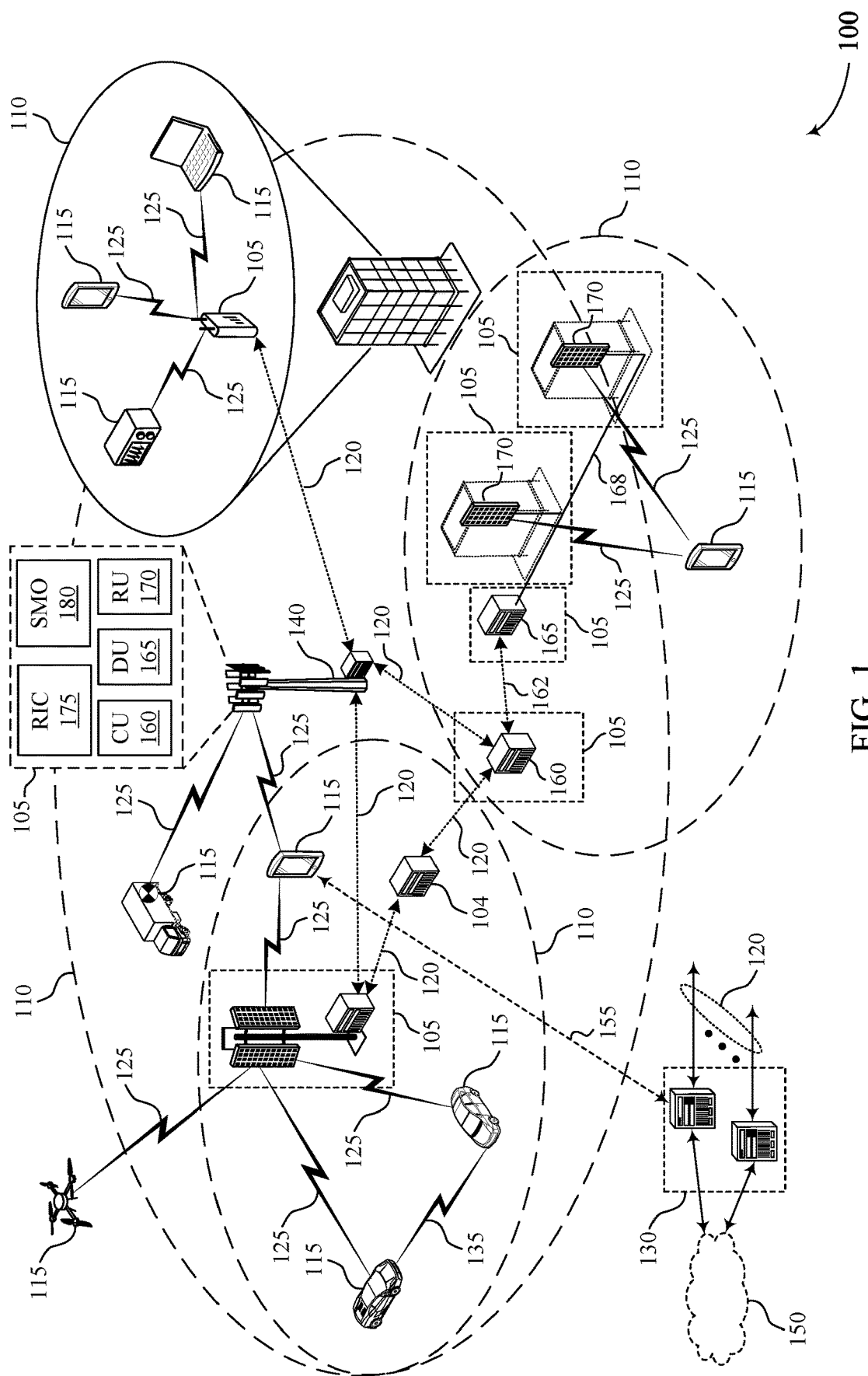
FIG. 1 illustrates an example of a wireless communications system that supports techniques for reducing latency of data in the presence of scheduled uplink transmissions in accordance with one or more aspects of the present disclosure.

Some wireless communications systems may support applications at a user equipment (UE) or other wireless device that implement ultra-reliable and low latency communication services, such as gaming, video streaming, or extended reality (XR) technology, among other examples. To support these kind of applications, a network may implement grant-free uplink transmissions (e.g., pre-configured grants or semi-persistently scheduled uplink communications, which may in some cases be referred to as uplink configured grants). In such cases, a device such as a UE may receive a configuration for a set of periodic uplink transmission opportunities and resources for periodically sending uplink data, or the UE may otherwise detect uplink transmissions for sending the uplink data. Such uplink configured grants may allow the UE to send data with reduced latency because the UE may avoid waiting for uplink resources to be scheduled or granted by the network in response to a scheduling request sent by the UE. Instead, the UE may use the periodic resources of the uplink grant configuration to transmit data after the uplink data becomes available at the UE.

In some cases, however, the periodicity of the uplink configured grant resources may not align (e.g., in time) with the arrival of uplink data at the UE. Such misalignment may increase delays for transmitting uplink packets and reduce overall performance for the UE. Additionally, in some cases, the UE may be prohibited from transmitting a scheduling request to obtain uplink resources when the UE is also configured with the uplink configured grant, which may introduce additional latency, particularly in cases where using a scheduling request to obtain resources may take less time than waiting for a next configured grant transmission opportunity.

To reduce latency, in some examples, the UE may dynamically determine whether to use uplink resources associated with a configured grant or uplink resources associated with a scheduling request. For example, the UE may either transmit a scheduling request (e.g., to obtain uplink resources for transmitting uplink data) or wait until a next transmission opportunity associated with the uplink configured grant for transmitting uplink data. In some implementations, the UE may identify that uplink data has become available (e.g., on a logical channel, and the UE may send either a scheduling request or wait until the configured grant transmission opportunity based on a delay calculation. For example, the UE may calculate a first duration between an arrival of the uplink data (e.g., an availability of the uplink data) and the next available configured grant transmission opportunity of the set of transmission opportunities. In addition, the UE may calculate a second duration between the arrival of the uplink data and a time (e.g., an estimated time) when scheduled resources may be available after sending the scheduling request and receiving an uplink grant in response to the scheduling request. In such examples, the UE may determine to transmit the scheduling request if the duration for waiting for the next configured grant transmission opportunity is greater than the duration associated with sending the scheduling request and receiving an associated resource allocation (e.g., if the first duration is greater than the second duration). In other examples, the UE may determine to use the next configured grant transmission opportunity if the duration for waiting for the next configured grant transmission opportunity is less than the duration associated with sending the scheduling request and receiving an associated resource allocation (e.g., if the second duration is greater than the first duration).

Additionally, or alternatively, the UE may either send a scheduling request or wait until the configured grant transmission opportunity based on a delay threshold. For example, the UE may receive a configuration of a delay threshold value (e.g., for low-latency traffic) that sets an upper bound for the latency allowed for the uplink data. Then, the UE may send the scheduling request if the duration associated with waiting for the next configured grant transmission opportunity is greater than the latency threshold (e.g., the first duration is greater than the delay threshold). Further, the UE may determine to use the next configured grant transmission opportunity if the duration for waiting for the next configured grant transmission opportunity is less than the delay threshold. The techniques described herein may therefore enable a UE to reduce latency for the uplink data and reduce power consumption by dynamically choosing between sending a scheduling request or a configured grant transmission opportunity that results in the soonest-available uplink resources.

Aspects of the disclosure are initially described in the context of wireless communications systems. Aspects of the disclosure are further illustrated by and described with reference to wireless communications system configurations, apparatus diagrams, system diagrams, a process flow, and flowcharts that relate to techniques for reducing latency of data in the presence of scheduled uplink transmissions.

FIG. 1 illustrates an example of a wireless communications system 100 that supports techniques for reducing latency of data in the presence of scheduled uplink transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for reducing latency of data in the presence of scheduled uplink transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A logical channel may be defined by a type of information carried on the logical channel. For example, logical channels may include one or more control channels (e.g., common control channel (CCCH), dedicated control channel (DCCH)) that carry control and configuration information, as well as one or more traffic channels (e.g., dedicated traffic channel (DTCH)) that carry user data. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support semi-persistent scheduling that enables the transmission of data on periodic resources and without receiving a grant (an uplink grant, a downlink grant) for the respective resources. For instance, to support some services and/or applications (e.g., ultra-reliable and low latency communication services, gaming, video streaming, or XR technology, augmented reality (AR) technology, among other examples), the wireless communications system 100 may support grant-free uplink and downlink transmissions (e.g., semi-persistently scheduled communications, uplink configured grants, pre-scheduled grants or the like). As an example, a device such as a UE 115 may receive a configuration for a set of periodic uplink transmission opportunities and resources for periodically sending uplink data. Such uplink configured grants may allow the UE 115 to send data with reduced latency because the UE 115 may avoid waiting for uplink resources to be scheduled or granted by the network in response to a scheduling request sent by the UE 115. Instead, the UE 115 may use the periodic resources of the uplink grant configuration to transmit data after the uplink data becomes available at the UE 115. Semi-persistent scheduling may be configured via RRC signaling and the associated periodic resources may, in some examples, be activated via DCI (e.g., for Type 2 configured grant).

Data arrival at a UE 115 (e.g., corresponding to a buffer status report (BSR) trigger) may prompt the UE 115 to transmit a scheduling request to a network entity 105 so that the UE 115 may receive uplink resources granted by the network to transmit the uplink data. In some cases, the scheduling request may be transmitted when one or more conditions or rules are satisfied. For example, a scheduling request may be transmitted if the UE 115 determines an absence of uplink resources available to transmit the uplink data. Additionally, or alternatively, the scheduling request may be transmitted in cases where semi-persistent scheduling (e.g., an uplink configured grant) is configured for the UE 115 and the logical channel that triggered a BSR has a scheduling request channel mask (e.g., a logicalChannelSR-Mask) set to false.

The resources associated with a configured grant, however, may be considered available if configured via RRC signaling and/or activated by additional signaling. Thus, when the UE 115 is configured with semi-persistent scheduling (e.g., the uplink configured grant), the UE 115 may be prohibited from sending a scheduling request because the semi-persistently scheduled resources may be considered as available. For instance, the resources associated with a configured grant may be available immediately (e.g., within a threshold number of slots from arrival of the uplink data) or a number of slots in the future (e.g., X slots in future) based on the periodicity set for the configured grant. Further, in cases where a scheduling request channel mask (e.g., the logicalChannelSR-Mask) is set to false, the UE 115 may also be prohibited from triggering a scheduling request for a specific logical channel when the configured grant is present (e.g., configured), which may further limit opportunities for the UE 115 to transmit a scheduling request when data is available.

Moreover, even if low latency traffic arrives on a logical channel without a scheduling request channel mask (e.g., the logicalChannelSR-Mask), the scheduling request may not be triggered if a configured grant is present. For example, if a UE 115 receives uplink data to transmit (e.g., a regular BSR has been triggered) and a channel delay timer (e.g., logicalChannelSR-DelayTimer) is not running, the UE 115 may only transmit a scheduling request if there is no uplink shared channel (UL-SCH) resource available for a new transmission, or if the MAC entity is configured with one or more uplink configured uplink grants and the BSR was triggered for a logical channel for which logicalChannelSR-Mask is set to false. In some other examples, the scheduling request may be sent by the UE 115 if the UL-SCH resources available for a new transmission fail to meet logical channel prioritization (LCP) mapping restriction configured for the logical channel that triggered the BSR. UL-SCH resources, however, may be considered available if the MAC entity has an active configuration for either type of configured uplink grants, or if the MAC entity has received a dynamic uplink grant, or both. In cases that the MAC entity has determined at a given point in time that UL-SCH resources are available, which may not imply that the UL-SCH resources are available for use by the UE 115 at that point in time. In any case, when the UE 115 is unable to transmit a scheduling request for available data (e.g., based on one or more conditions that may not be satisfied), some data (e.g., low-latency traffic) may be delayed in the presence of a semi-persistent scheduling configuration.

Wireless communications system 100 may support dynamic determinations of whether to transmit a scheduling request or use either semi-persistently scheduled transmission opportunities or pre-scheduled grants based on delay calculations, and such techniques may be implemented by UEs 115 or other wireless devices that are configured for communications (e.g., for ultra-reliable and low latency communication services) using grant-free uplink transmissions (e.g., pre-scheduled grants, semi-persistently scheduled uplink communications, which may be referred to as uplink configured grants or other like terminology). As an example, a UE 115 may receive a configuration for a set of periodic uplink transmission opportunities for sending uplink data. In such cases, the UE 115 may dynamically determine whether to use uplink resources associated with the configured grant or uplink resources associated with a scheduling request. In particular, the UE 115 may transmit either a scheduling request (e.g., to obtain uplink resources) or the UE 115 may wait until a next transmission opportunity associated with the uplink configured grant, which may be based on how quickly resources may be available after the arrival of uplink data (e.g., on a logical channel).

In some aspects, the UE 115 may identify that uplink data has become available for transmission, and the UE 115 may either send a scheduling request or use a transmission opportunity associated with the configured grant based on a latency calculation. For example, the UE 115 may calculate a first duration between the availability of the uplink data and the next available transmission opportunity, and the UE 115 may further calculate a second duration between the availability of the uplink data and a time when uplink resources may be available in response to a scheduling request. In such examples, the UE 115 may transmit the scheduling request if the duration for waiting for the configured grant transmission opportunity is greater than the duration associated with sending the scheduling request and then being allocated uplink resources. In some other implementations, the UE 115 may either send a scheduling request or use the configured grant transmission opportunity based on a delay threshold. For example, the UE 115 may receive a delay threshold value for low-latency traffic and may send the scheduling request if the delay associated with waiting for the next configured grant transmission opportunity is greater than the latency threshold. In any case, the UE 115 may dynamically determine the shortest delay in obtaining resources for transmitting the uplink data, thereby reducing latency for data transmissions.

Figure 2:
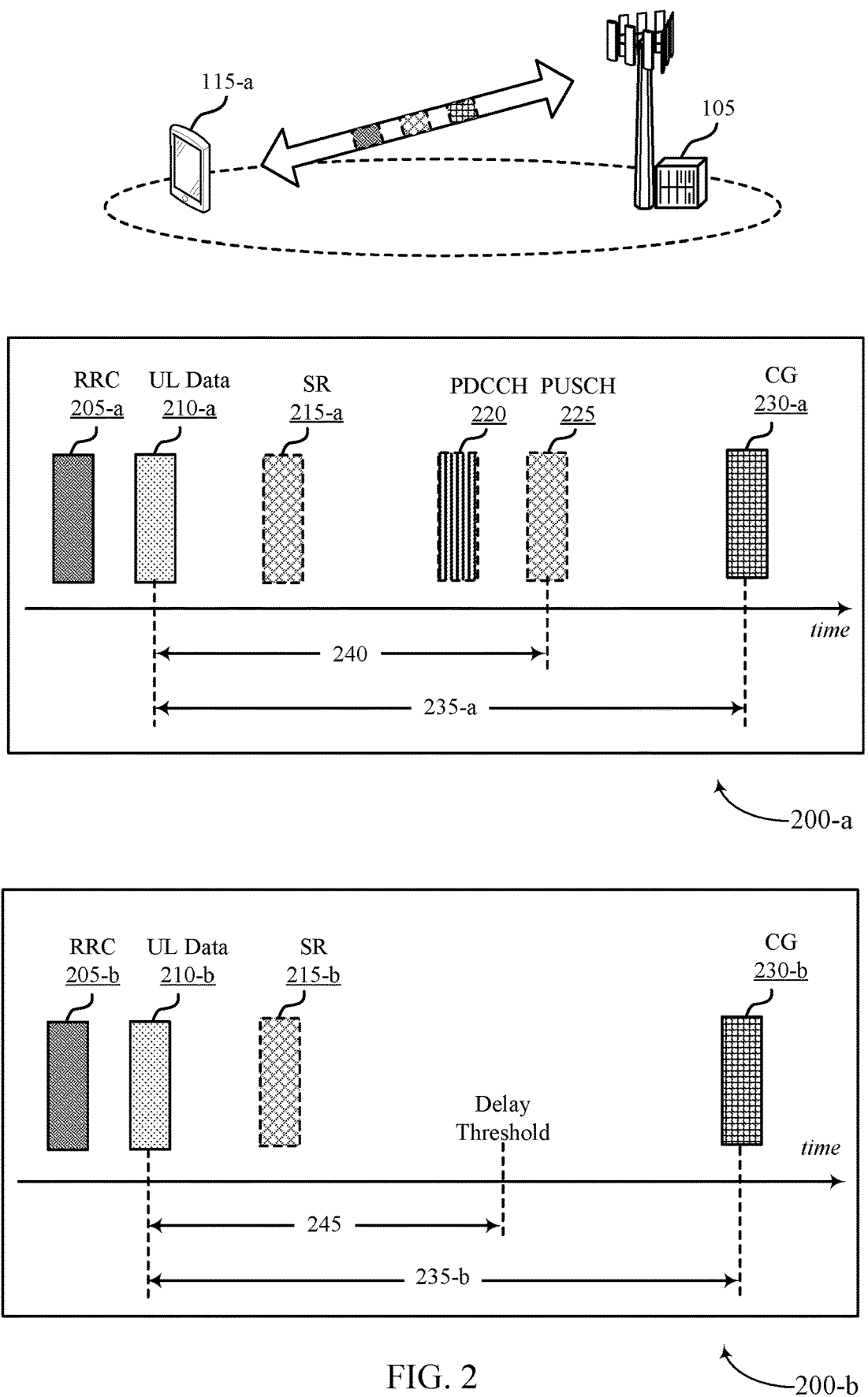
FIG. 2 illustrates example wireless communications system configurations that support techniques for reducing latency of data in the presence of scheduled uplink transmissions in accordance with one or more aspects of the present disclosure.

FIG. 2 illustrates example wireless communications configurations 200-*a* and 200-*b* that support techniques for reducing latency of data in the presence of scheduled uplink transmissions in accordance with one or more aspects of the present disclosure. For example, wireless communications configurations may implement signaling between a network entity 105 and a UE 115-*a*, each of which may be examples of corresponding devices described with reference to FIG. 1.

Some wireless communications systems (e.g., 5G/NR networks) may support running applications at a UE 115-*a* that may implement ultra-reliable and low latency communication services, such as gaming, video streaming, XR, or any other application that requires relatively low latency to maintain a threshold quality of user experience. To support these kind of applications, a network may implement grant-free uplink transmissions (e.g., uplink configured grants, semi-persistent scheduling), where a device such as a UE 115-*a* may receive a configuration for a set of periodic uplink transmission opportunities and resources for sending uplink data. For example, the UE 115-*a* may receive control signaling (such as RRC signaling) which includes a configuration for a set of configured grants or semi-persistently scheduled transmission opportunities for the UE 115-*a* to periodically transmit uplink data to the network entity 105.

In some examples, the uplink configuration may be activated by additional control signaling (e.g., DCI activation for Type-2 configured grants). Such uplink configured grants may allow the UE 115-*a* to send data more flexibly and with reduced latency, because the UE 115-*a* may avoid waiting for uplink resources to be scheduled or granted by the network in response to a scheduling request sent by the UE 115-*a*. Instead, the UE 115-*a* may use the periodic resources of the uplink configured grant to transmit data after the uplink data becomes available at the UE 115-*a*. Further, such configured grant implementations may increase power savings by the UE 115-*a* because the UE 115-*a* may avoid monitoring for downlink transmissions (e.g., on a physical downlink control channel (PDCCH)) between transmitting a scheduling request and receiving a grant for uplink resources. The use of the uplink configured grant at the UE 115-*a* may also avoid configuring a DRX inactivity timer, thereby achieving further power savings.

In some other examples, the uplink resources may include a set of uplink grants that are prescheduled by the network. Such pre-scheduled grants may be transmitted by the network entity 105 without the UE 115-*a* requesting the uplink grant via a scheduling request. In such cases, the network may not provide a configuration for the uplink grants to the UE 115-*a*, but rather the UE 115-*a* detects the presence of these grants based on various monitoring procedures.

In some cases, however, the periodicity of the uplink configured grant resources may not align (e.g., in time) with the arrival of uplink data at the UE 115-*a*. For example, the configured grant periodicity may not match the traffic periodicity such that the uplink traffic does not arrive right before a transmission opportunity. In some cases, such misalignment may be due to a non-integer traffic duty cycle (e.g., due to video at 60 frames per second (fps), resulting in packets every 16.67 ms), or some other differences in timing between available traffic and the periodic resources. Such misalignment may increase delays for transmitting uplink packets and reduce overall performance for the UE 115-*a*, and may further introduce inconsistency in the transmission of data (e.g., associated with low-latency traffic). Additionally, in some cases, various rule or conditions may prevent the UE 115-*a* from transmitting a scheduling request to obtain uplink resources (e.g., via a dynamic grant or BSR trigger) when the UE 115-*a* is configured with the uplink configured grant, which may introduce additional latency in cases where using a scheduling request may take less time than waiting for a next configured grant.

In some examples, the UE 115-*a* may dynamically determine whether to use uplink resources associated with a configured or pre-scheduled grant or uplink resources associated with a scheduling request in order to reduce latency for data transmissions. For example, when configured with uplink configured grant communications, the UE 115-*a* may either transmit a scheduling request (e.g., to obtain uplink resources) or wait until a next transmission opportunity associated with the uplink configured grant, based on which technique provides the earliest-available uplink resources.

As a first example, in configuration 200-*a*, the UE 115-*a* may receive an RRC message 205-*a* that configures the UE 115-*a* with semi-persistent scheduling (e.g., a set of uplink configured grant transmission opportunities) or the UE 115-*a* may detect a pre-scheduled grant for sending uplink traffic. The UE 115-*a* may identify that uplink data 210-*a* has become available. For example, low latency traffic for the UE 115-*a* may be present on a logical channel. In some cases, the logical channel may not have scheduling request masking configured (e.g., logicalchannelSR-Mask may not be configured).

As described herein, the UE 115-*a* may determine to either send a scheduling request 215-*a* or wait until a next uplink configured grant transmission opportunity 230-*a* based on a latency calculation (e.g., a computation of one or more durations between respective events). For example, the UE 115-*a* may calculate a first duration 235-*a* between the availability of the uplink data 210-*a* and the next uplink configured grant transmission opportunity 230-*a*. The UE 115-*a* may further calculate a second duration 240 between the availability of the uplink data 210-*a* and the availability of uplink resources (e.g., on a physical uplink shared channel (PUSCH) 225 in response to the scheduling request 215-*a*. The second duration 240 may include a time interval that includes an amount of time until a next scheduling request opportunity to transmit the scheduling request 215-*a* in addition to an amount of time to receive downlink control information (e.g., via a physical downlink control channel (PDCCH) 220) that schedules or grants uplink resources on the PUSCH 225.

In some cases, the UE 115-*a* may calculate the second duration 240 based on information associated with other scheduling requests, such as measured delays from previous scheduling requests to PUSCH grants durations. For instance, the UE 115-*a* may use an average (e.g., a weighted average) associated with two or more previous scheduling request transmissions (e.g., for a duration between transmitting the scheduling request until uplink resources are scheduled). Generally, the UE 115-*a* may estimate the second duration 240 based on one or more parameters associated with prior scheduling requests. The durations until the next uplink configured grant transmission opportunity 230-*a* may be based on a periodicity of the uplink configured grant resources. Similarly, a duration until a next scheduling request opportunity may be based on a periodicity of scheduling request resources.

Based on the first duration 235-*a* and the second duration 240, the UE 115-*a* may then determine to transmit the scheduling request 215-*a* if the duration until the next uplink configured grant transmission opportunity 230-*a* (e.g., the first duration 235-*a*) is greater than the duration associated with sending the scheduling request and receiving an associated resource allocation (e.g., the second duration 240). Put another way, if (duration until a next uplink configured grant transmission opportunity 230-*a*)>(duration until a next scheduling request occasion+scheduling request 215-*a* to PUSCH 220 delay), then the UE 115-*a* may determine to send the scheduling request 215-*a* to further reduce latency for uplink data transmissions. In other examples, the UE may determine to use the next uplink configured grant transmission opportunity 230-*a* if the duration for waiting for the next uplink configured grant transmission opportunity 230-*a* is less than the duration associated with sending the scheduling request 215-*a* and the allocation of the PUSCH 225 (e.g., if the second duration 240 is greater than the first duration 235-*a*). Based on determining the shortest duration between either using the scheduling request 215-*a* or the configured grant transmission opportunity 230-*a*, the UE 115-*a* may reduce latency for the transmission of the uplink data 210-*a*.

In another example illustrated by configuration 200-*b*, the UE 115-*a* may receive an RRC message 205-*b* that configures the UE 115-*a* with a set of configured grant transmission opportunities for sending uplink traffic. Further, uplink data (e.g., low-latency traffic) for the UE 115-*a* may become available on a logical channel. The logical channel, in some examples, may not have scheduling request masking (e.g., logicalchannelSR-Mask is not configured).

The UE 115-*a* may identify that the uplink data 210-*b* has become available and may send either a scheduling request 215-*b* or may wait until the configured grant transmission opportunity 230-*b* based on a delay threshold. For example, the UE 115-*a* may calculate the first duration 235-*b* between the availability of the uplink data 210-*b* and the next configured grant transmission opportunity 230-*b*. Further, the UE 115-*a* may receive an indication of a delay threshold 245 (e.g., delay threshold). The delay threshold 245 may set an upper bound for the latency allowed for the uplink data 210-*b*. In some cases, the delay threshold 245 may have some value and be indicated in control signaling, such as RRC signaling, a MAC-CE, or the like. In some examples, the delay threshold 245 may be based on one or more parameters associated with an application or service running at the UE 115-*a*. In some other examples, one or more applications at the UE 115-*a* may send an indication of the delay threshold 245 to the modem of the UE 115-*a*.

The UE 115-*a* may send the scheduling request 215-*b* if the delay until the next configured grant transmission opportunity 230-*b* (e.g., the first duration 235-*b*) is greater than the delay threshold 245. That is, if (duration until next configured grant transmission opportunity 230-*b*)>(delay threshold 245), then the UE 115-*a* may transmit the scheduling request 215-*b*. In other examples, the UE 115-*a* may determine to use the next configured grant transmission opportunity 230-*b* if the duration until the next configured grant transmission opportunity 230-*b* is less than the delay threshold 245. As such, the configuration 200-*b* may support bounded latency for the uplink data 210-*b*, which may reduce power consumption and latency because the UE 115-*a* may transmit the scheduling request 215-*b* in cases where the latency exceeds the latency delay threshold.

In either configuration 200-*a* or 200-*b*, the UE 115-*a* may reduce latency for the uplink data 210 and reduce unnecessary power consumption by dynamically choosing between sending a scheduling request or a configured grant. Additionally, or alternatively, configurations 200-*a* or 200-*b* may be implemented in cases that low latency traffic for the UE 115-*a* is present on a logical channel with SR masking (e.g., logicalchannelSR-Mask is configured). For example, the UE may determine to send either a scheduling request 215 or wait for the configured grant transmission opportunity 230 based on determining that the delay introduced by waiting for the configured grant exceeds a threshold delay. In cases that the UE 115-*a* determines to transmit the scheduling request 215 for a given logical channel, then the scheduling request 215 for that logical channel is used. In other examples, a scheduling request 215 configured for a different logical channel may be used.

Figure 3:
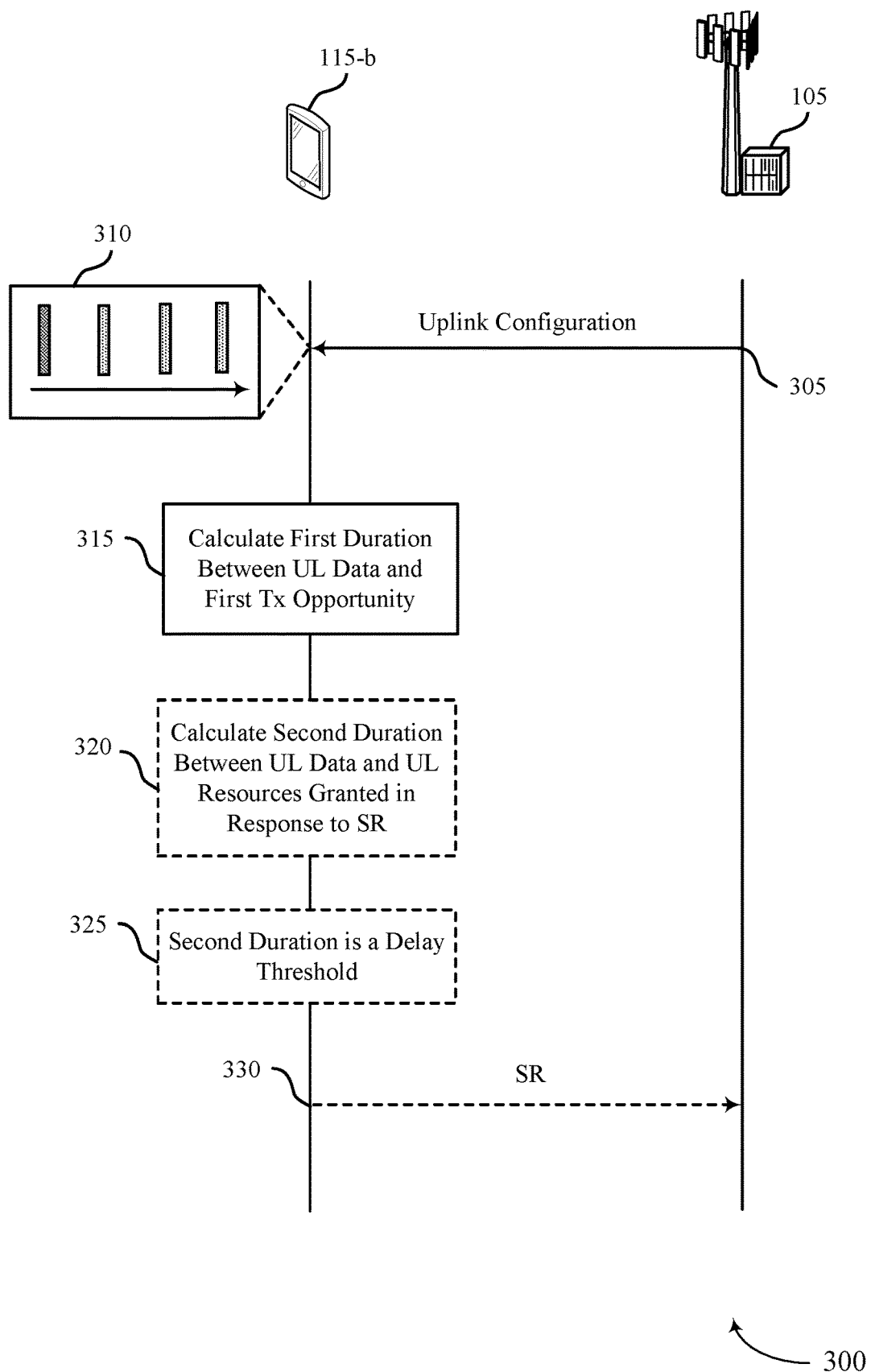
FIG. 3 illustrates an example of a process flow in a system that supports techniques for reducing latency of data in the presence of scheduled uplink transmissions in accordance with one or more aspects of the present disclosure.

FIG. 3 illustrates an example of a process flow 300 in a system that supports techniques for reducing latency of data in the presence of scheduled uplink transmissions in accordance with one or more aspects of the present disclosure. The process flow 300 may implement aspects of wireless communications system 100 and the wireless communications configurations 200, or may be implemented by aspects of the wireless communications system 100. For example, the process flow 300 may illustrate operations between a UE 115-*b* and a network entity 105, which may be examples of corresponding devices described with reference to FIGS. 1 and 2. In the following description of the process flow 300, the operations between the devices may be transmitted in a different order than the example order shown, or the operations may be performed in different orders or at different times or by different devices. Additionally, or alternatively, some operations may also be omitted from the process flow 300, and other operations may be added to the process flow 300.

At 305, the UE 115-*b* may receive a first control message that indicates a set of scheduled uplink communications including a set of transmission opportunities 310 for transmitting one or more uplink messages. In some examples, the set of scheduled uplink communications may indicate a set of configured grants. In some examples, the set of scheduled uplink communications may include a set of semi-persistently scheduled uplink communications, a set of pre-scheduled uplink communications, or both.

At 315, the UE 115-*b* may calculate a first duration between an availability of uplink data at the UE 115-*b* and a transmission opportunity of the set of transmission opportunities for transmitting the uplink data.

In some implementations, at 320, the UE 115-*b* may calculate a second duration based on a duration between the availability of the uplink data and an availability of uplink resources granted in response to a scheduling request transmission. Then, at 330, the UE 115-*b* may transmit a scheduling request for the uplink data based on the first duration being greater than a second duration. In such implementations, the UE 115-*b* may calculate the first duration based on a first periodicity associated with the set of transmission opportunities, and may calculate the second duration based on a second periodicity associated with resources for transmitting the scheduling request. In some other cases, the UE 115-*b* may calculate the second duration based on a duration between one or more previous scheduling request transmissions and respective uplink resources scheduled in response to each of the one or more previous scheduling request transmissions performed by the UE 115-*b* (e.g., an average duration between the one or more previous scheduling request transmissions and the respective uplink resources scheduled).

In some other implementations, at 325, the UE 115-*b* may receive a control message which indicates a configuration of a delay threshold, and at 330, the UE 115-*b* may transmit a scheduling request for the uplink data based on the first duration being greater than the delay threshold. In some examples, the delay threshold may be an upper bound for a latency of the uplink data.

In some other implementations, the UE 115-*b* may receive an indication of a scheduling request mask configured for a logical channel corresponding to the uplink data, and may determine that the scheduling request is configured for the logical channel corresponding to the uplink data. The UE 115-*b* may transmit the scheduling request based on the scheduling request being configured for the logical channel and the first duration being greater than the second duration. In some other examples, the UE 115-*b* may determine that the scheduling request is configured for a second logical channel different from the first logical channel corresponding to the uplink data, and the UE 115-*b* may transmit the scheduling request based on the scheduling request being configured for the second logical channel and the first duration being greater than the second duration.

In some examples, the UE 115-*b* may receive, in response to the scheduling request, a DCI which schedules uplink resources for the uplink data on a first logical channel, where the DCI is received prior to the transmission opportunity. The UE 115-*b* may then transmit the uplink data from the first logical channel using the uplink resources.

Figure 4:
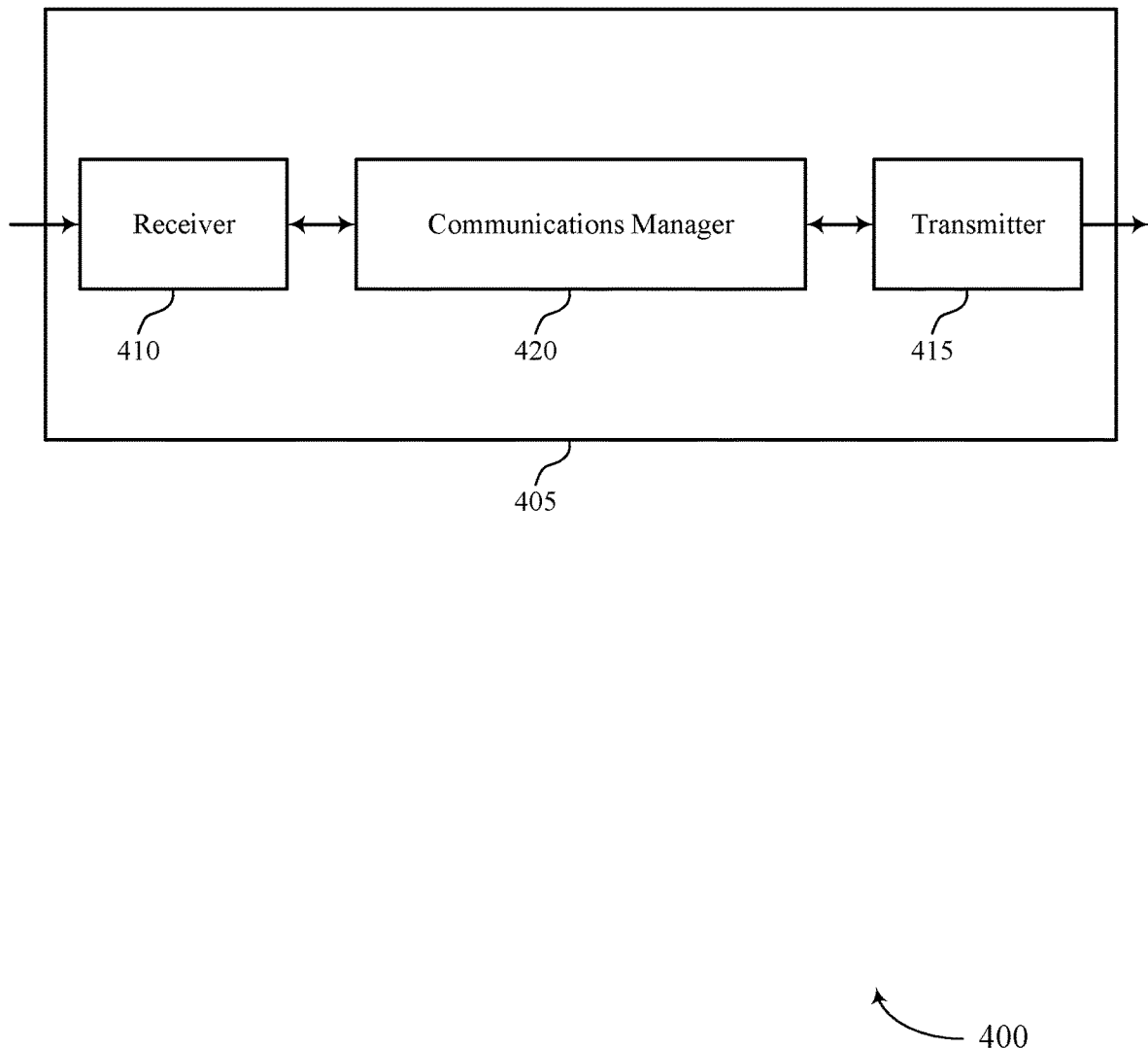
FIGS. 4 and 5 show block diagrams of devices that support techniques for reducing latency of data in the presence of scheduled uplink transmissions in accordance with one or more aspects of the present disclosure.

FIG. 4 shows a block diagram 400 of a device 405 that supports techniques for reducing latency of data in the presence of scheduled uplink transmissions in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for reducing latency of data in the presence of scheduled uplink transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for reducing latency of data in the presence of scheduled uplink transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for reducing latency of data in the presence of scheduled uplink transmissions as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for receiving a first control message indicating a set of scheduled uplink communications, the scheduled uplink communications including a set of transmission opportunities for transmitting one or more uplink messages. The communications manager 420 may be configured as or otherwise support a means for calculating a first duration between an availability of uplink data and a transmission opportunity of the set of transmission opportunities for transmitting the uplink data. The communications manager 420 may be configured as or otherwise support a means for transmitting a scheduling request for the uplink data based on the first duration being greater than a second duration.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced power consumption based on reduced channel monitoring and more efficient utilization of communication resources.

Figure 5:
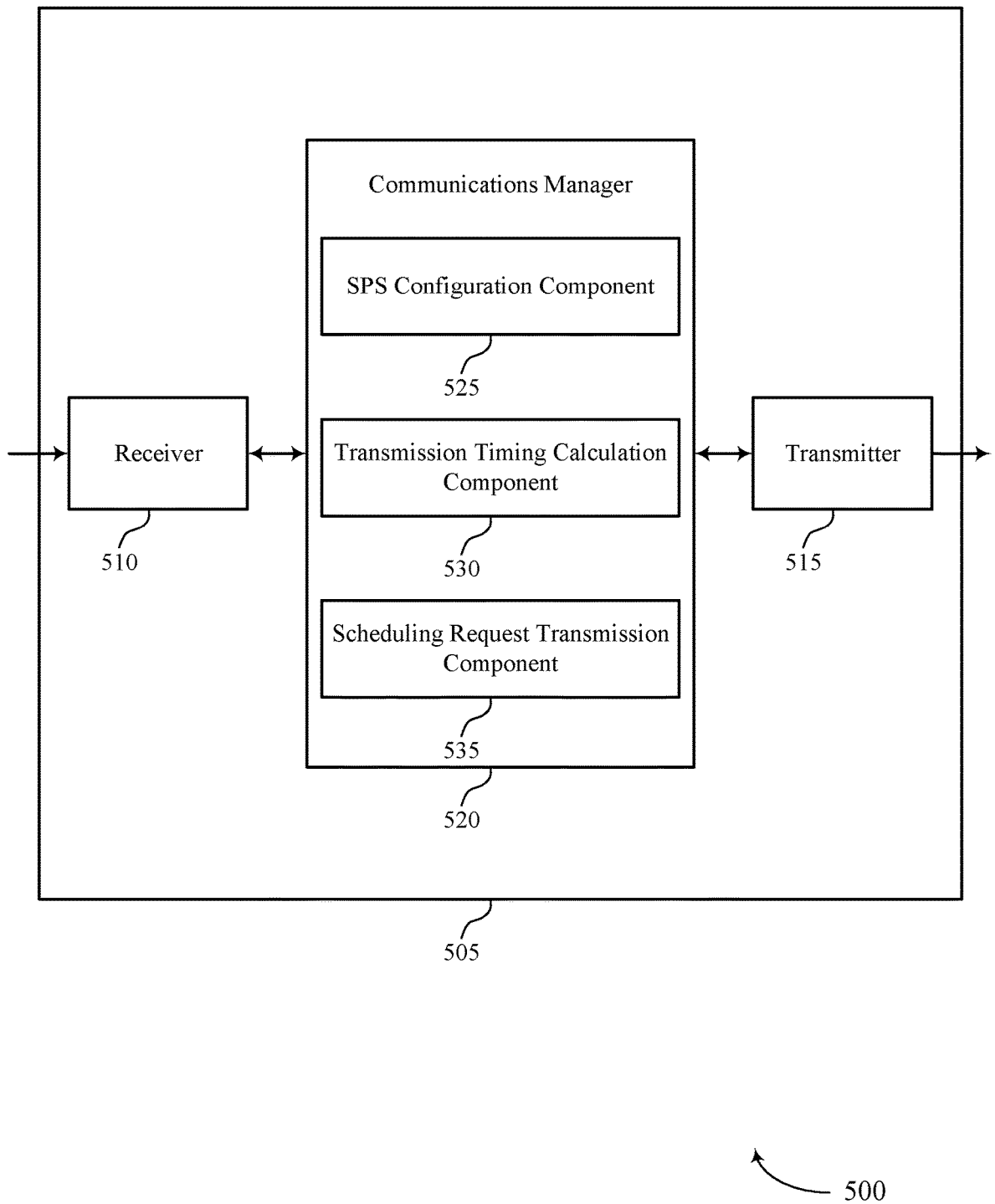

FIG. 5 shows a block diagram 500 of a device 505 that supports techniques for reducing latency of data in the presence of scheduled uplink transmissions in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for reducing latency of data in the presence of scheduled uplink transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for reducing latency of data in the presence of scheduled uplink transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for reducing latency of data in the presence of scheduled uplink transmissions as described herein. For example, the communications manager 520 may include an SPS configuration component 525, a transmission timing calculation component 530, a scheduling request transmission component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The SPS configuration component 525 may be configured as or otherwise support a means for receiving a first control message indicating a set of scheduled uplink communications, the scheduled uplink communications including a set of transmission opportunities for transmitting one or more uplink messages. The transmission timing calculation component 530 may be configured as or otherwise support a means for calculating a first duration between an availability of uplink data and a transmission opportunity of the set of transmission opportunities for transmitting the uplink data. The scheduling request transmission component 535 may be configured as or otherwise support a means for transmitting a scheduling request for the uplink data based on the first duration being greater than a second duration.

Figure 6:
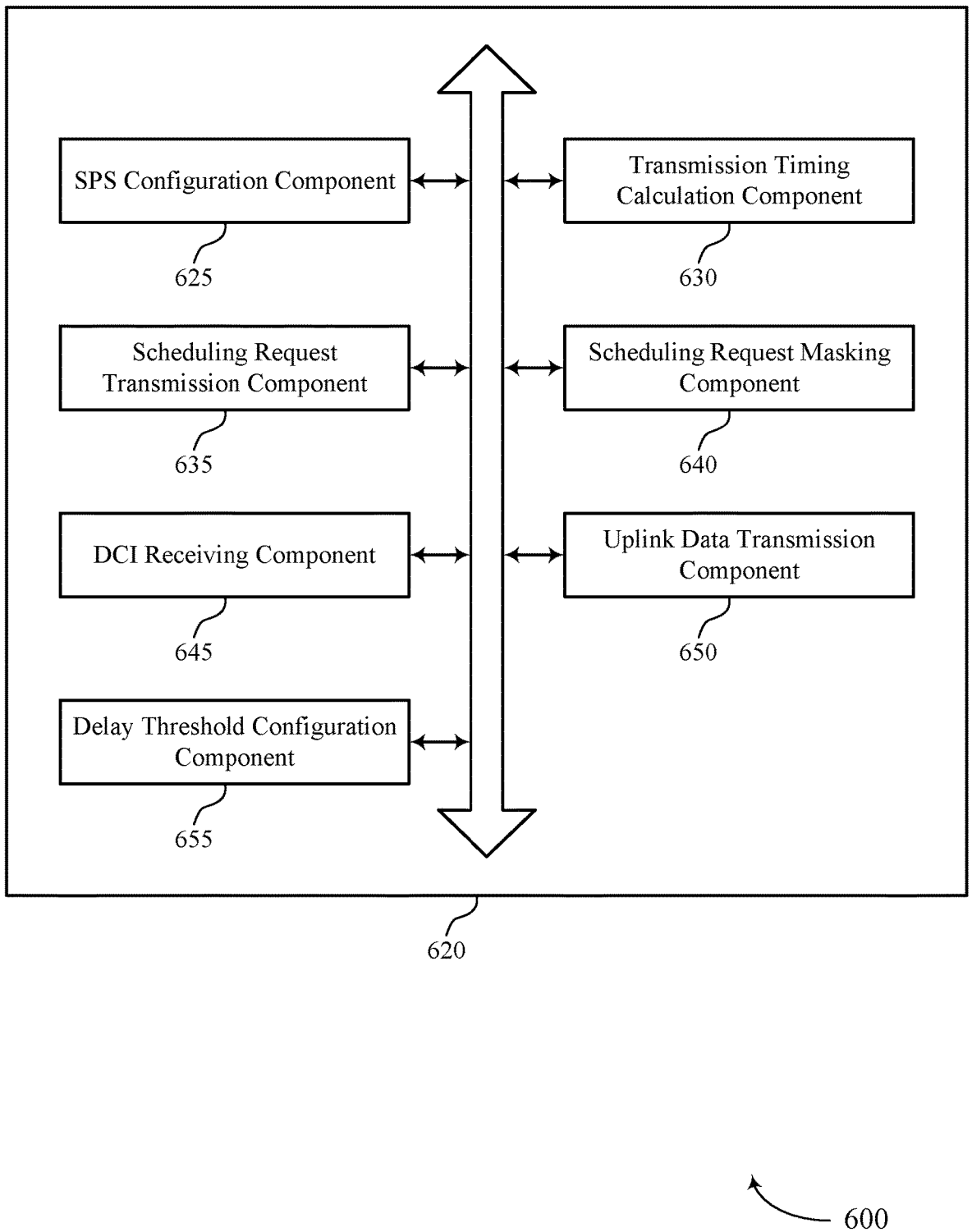
FIG. 6 shows a block diagram of a communications manager that supports techniques for reducing latency of data in the presence of scheduled uplink transmissions in accordance with one or more aspects of the present disclosure.

FIG. 6 shows a block diagram 600 of a communications manager 620 that supports techniques for reducing latency of data in the presence of scheduled uplink transmissions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for reducing latency of data in the presence of scheduled uplink transmissions as described herein. For example, the communications manager 620 may include an SPS configuration component 625, a transmission timing calculation component 630, a scheduling request transmission component 635, a scheduling request masking component 640, a DCI receiving component 645, an uplink data transmission component 650, a delay threshold configuration component 655, or any combination thereof. Each of these components may communicate, directly or indirectly, with one another (e.g., via one or more buses).

The communications manager 620 may support wireless communication at a UE in accordance with examples as disclosed herein. The SPS configuration component 625 may be configured as or otherwise support a means for receiving a first control message indicating a set of scheduled uplink communications, the set of scheduled uplink communications including a set of transmission opportunities for transmitting one or more uplink messages. The transmission timing calculation component 630 may be configured as or otherwise support a means for calculating a first duration between an availability of uplink data and a transmission opportunity of the set of transmission opportunities for transmitting the uplink data. The scheduling request transmission component 635 may be configured as or otherwise support a means for transmitting a scheduling request for the uplink data based on the first duration being greater than a second duration.

In some examples, the transmission timing calculation component 630 may be configured as or otherwise support a means for calculating the second duration based on a duration between the availability of the uplink data and an availability of uplink resources granted in response to a scheduling request transmission.

In some examples, to support calculating the first duration, the transmission timing calculation component 630 may be configured as or otherwise support a means for calculating the first duration based on a first periodicity associated with the set of transmission opportunities, and where calculating the second duration includes. In some examples, to support calculating the first duration, the transmission timing calculation component 630 may be configured as or otherwise support a means for calculating the second duration based on a second periodicity associated with resources for transmitting the scheduling request.

In some examples, to support calculating the second duration, the transmission timing calculation component 630 may be configured as or otherwise support a means for calculating the second duration based on a duration between one or more previous scheduling request transmissions and respective uplink resources scheduled in response to each of the one or more previous scheduling request transmissions.

In some examples, the second duration is based on an average duration between the one or more previous scheduling request transmissions and the respective uplink resources scheduled.

In some examples, the second duration includes a delay threshold associated with the uplink data.

In some examples, the delay threshold configuration component 655 may be configured as or otherwise support a means for receiving a second control message indicating a configuration of the delay threshold.

In some examples, the delay threshold includes an upper bound for a latency of the uplink data.

In some examples, the scheduling request masking component 640 may be configured as or otherwise support a means for receiving an indication of a scheduling request mask configured for a logical channel corresponding to the uplink data. In some examples, the scheduling request transmission component 635 may be configured as or otherwise support a means for determining that the scheduling request is configured for the logical channel corresponding to the uplink data, where the scheduling request is transmitted based on the scheduling request being configured for the logical channel and the first duration being greater than the second duration.

In some examples, the scheduling request masking component 640 may be configured as or otherwise support a means for receiving an indication of a scheduling request mask configured for a first logical channel corresponding to the uplink data. In some examples, the scheduling request transmission component 635 may be configured as or otherwise support a means for determining that the scheduling request is configured for a second logical channel different from the first logical channel corresponding to the uplink data, where the scheduling request is transmitted based on the scheduling request being configured for the second logical channel and the first duration being greater than the second duration.

In some examples, the DCI receiving component 645 may be configured as or otherwise support a means for receiving, in response to the scheduling request, downlink control information scheduling uplink resources for the uplink data on a first logical channel, where receiving the downlink control information scheduling the uplink resources occurs prior to the transmission opportunity. In some examples, the uplink data transmission component 650 may be configured as or otherwise support a means for transmitting the uplink data from the first logical channel using the uplink resources.

Figure 7:
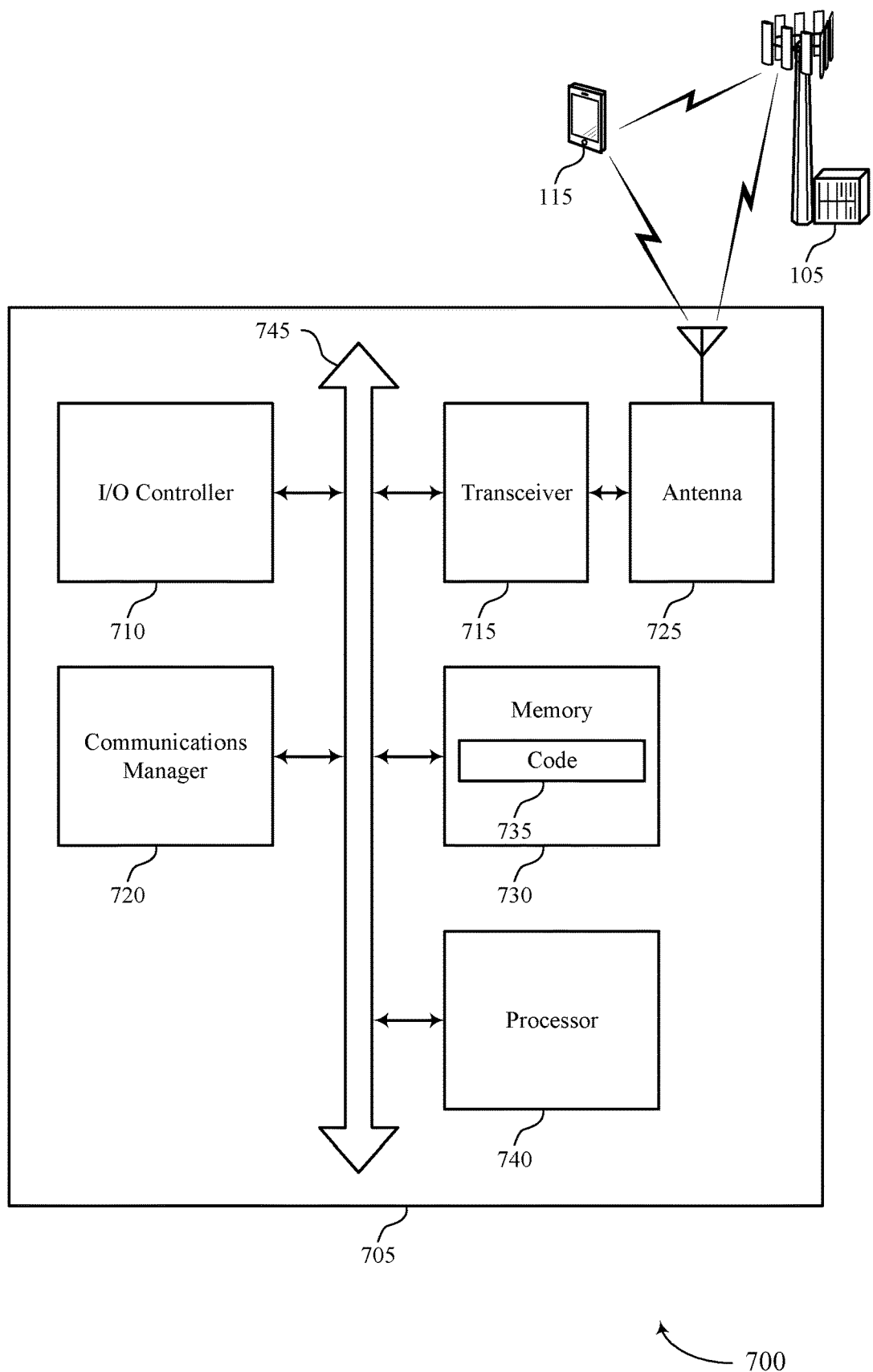
FIG. 7 shows a diagram of a system including a device that supports techniques for reducing latency of data in the presence of scheduled uplink transmissions in accordance with one or more aspects of the present disclosure.

FIG. 7 shows a diagram of a system 700 including a device 705 that supports techniques for reducing latency of data in the presence of scheduled uplink transmissions in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for reducing latency of data in the presence of scheduled uplink transmissions). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a first control message indicating a set of scheduled uplink communications, the set of scheduled uplink communications including a set of transmission opportunities for transmitting one or more uplink messages. The communications manager 720 may be configured as or otherwise support a means for calculating a first duration between an availability of uplink data and a transmission opportunity of the set of transmission opportunities for transmitting the uplink data. The communications manager 720 may be configured as or otherwise support a means for transmitting a scheduling request for the uplink data based on the first duration being greater than a second duration.

By including or configuring the communications manager 720 in accordance with examples as described herein, the device 705 may support techniques for improved communication reliability, reduced latency, improved user experience related to reduced latency and increased reliability, reduced power consumption, more efficient utilization of communication resources, longer battery life, improved utilization of processing capability, more dynamic determination of whether to use a configured grant or resources granted via a scheduling request.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for reducing latency of data in the presence of scheduled uplink transmissions as described herein, or the processor 740 and the memory 730 may be otherwise configured to perform or support such operations.

Figure 8:
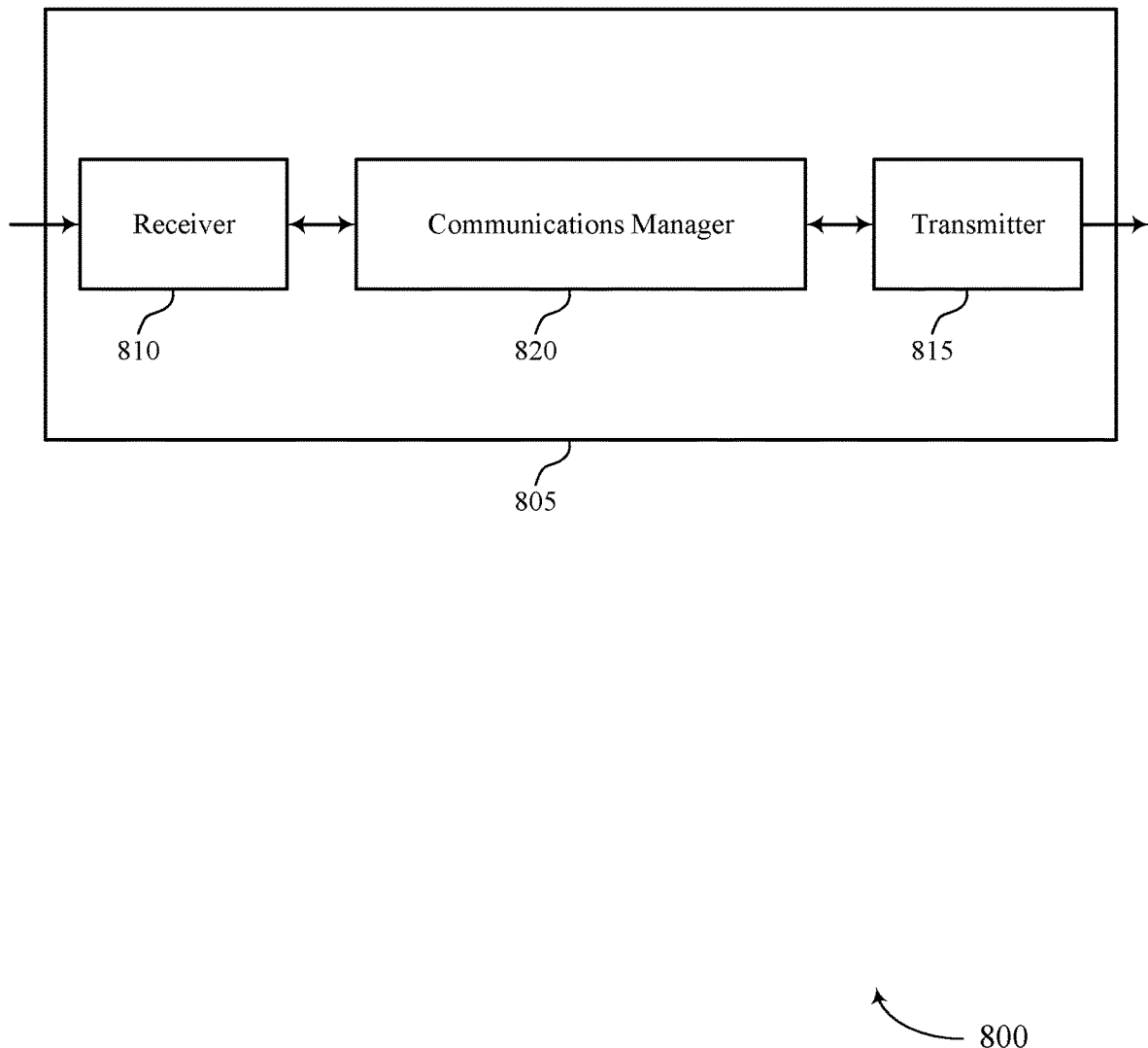
FIGS. 8 and 9 show block diagrams of devices that support techniques for reducing latency of data in the presence of scheduled uplink transmissions in accordance with one or more aspects of the present disclosure.

FIG. 8 shows a block diagram 800 of a device 805 that supports techniques for reducing latency of data in the presence of scheduled uplink transmissions in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for reducing latency of data in the presence of scheduled uplink transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting a first control message indicating a set of scheduled uplink communications, the set of scheduled uplink communications including a set of transmission opportunities for transmitting one or more uplink messages. The communications manager 820 may be configured as or otherwise support a means for receiving a scheduling request based on a first duration between an availability of uplink data and a transmission opportunity of the set of transmission opportunities being greater than a second duration. The communications manager 820 may be configured as or otherwise support a means for transmitting, in response to the scheduling request, downlink control information scheduling uplink resources for the uplink data, where the transmission of the downlink control information scheduling the uplink resources occur prior to the transmission opportunity.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption and more efficient utilization of communication resources.

Figure 9:
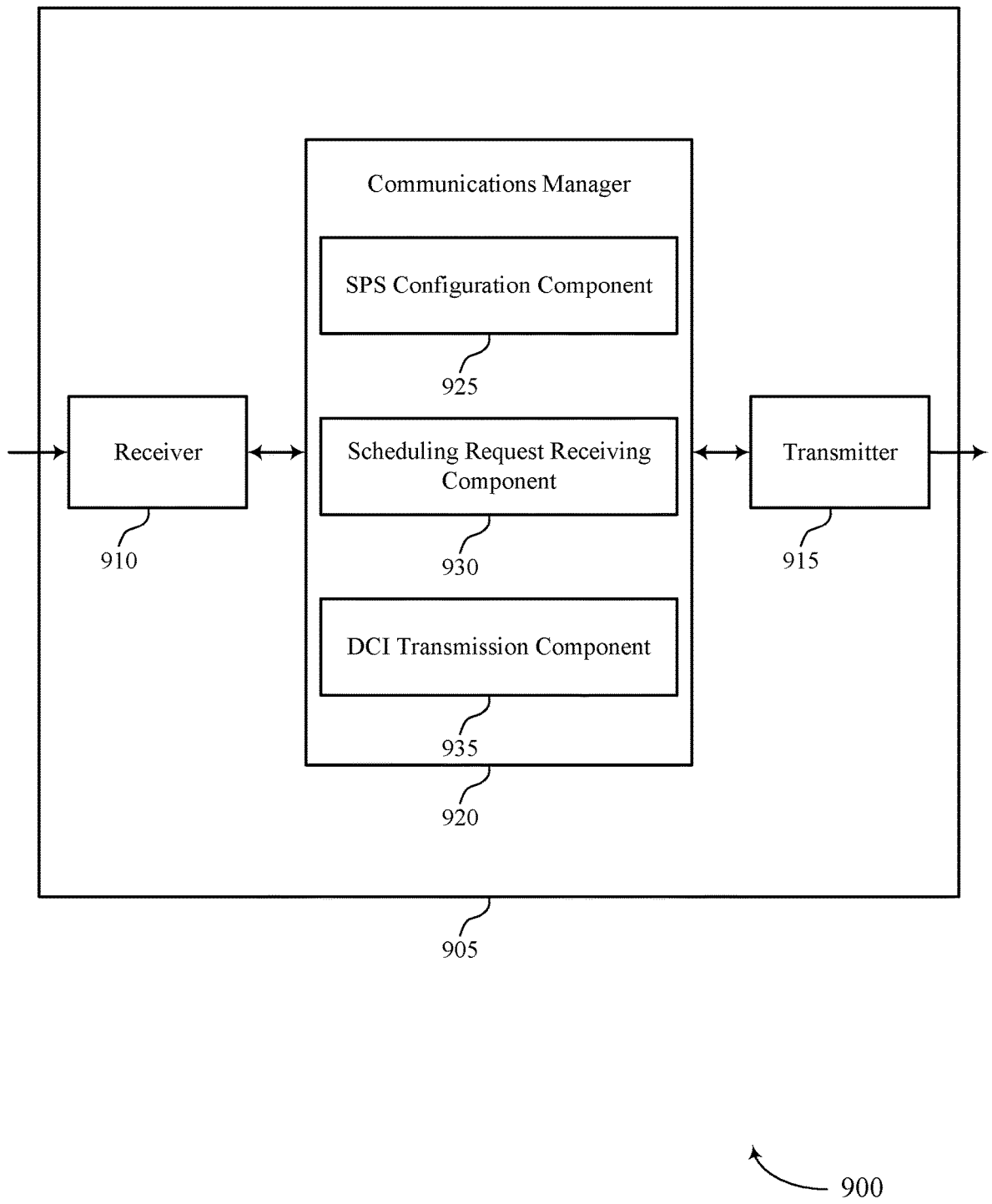

FIG. 9 shows a block diagram 900 of a device 905 that supports techniques for reducing latency of data in the presence of scheduled uplink transmissions in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for reducing latency of data in the presence of scheduled uplink transmissions as described herein. For example, the communications manager 920 may include an SPS configuration component 925, a scheduling request receiving component 930, a DCI transmission component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The SPS configuration component 925 may be configured as or otherwise support a means for transmitting a first control message indicating a set of scheduled uplink communications, the set of scheduled uplink communications including a set of transmission opportunities for transmitting one or more uplink messages. The scheduling request receiving component 930 may be configured as or otherwise support a means for receiving a scheduling request based on a first duration between an availability of uplink data and a transmission opportunity of the set of transmission opportunities being greater than a second duration. The DCI transmission component 935 may be configured as or otherwise support a means for transmitting, in response to the scheduling request, downlink control information scheduling uplink resources for the uplink data, where the transmission of the downlink control information scheduling the uplink resources occur prior to the transmission opportunity.

Figure 10:
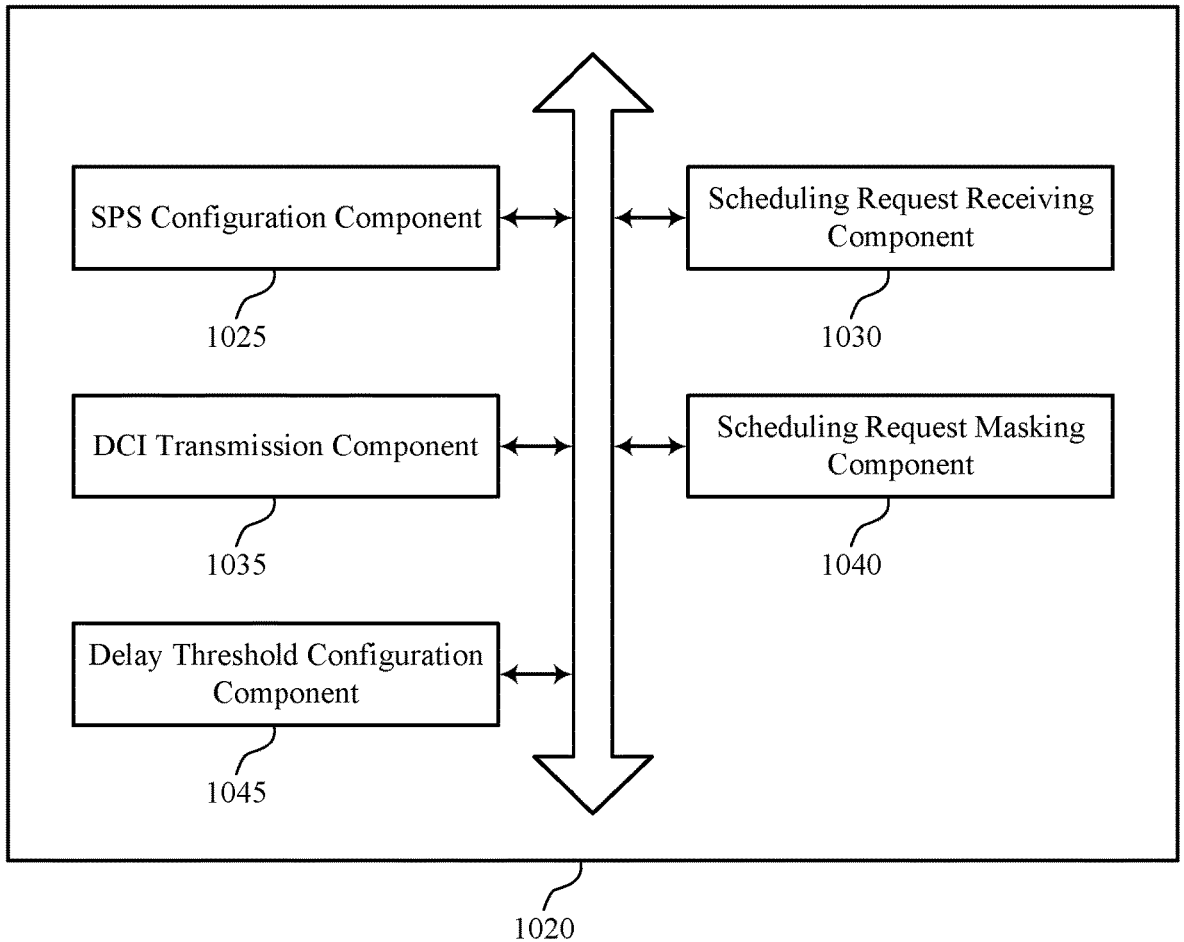
FIG. 10 shows a block diagram of a communications manager that supports techniques for reducing latency of data in the presence of scheduled uplink transmissions in accordance with one or more aspects of the present disclosure.

FIG. 10 shows a block diagram 1000 of a communications manager 1020 that supports techniques for reducing latency of data in the presence of scheduled uplink transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for reducing latency of data in the presence of scheduled uplink transmissions as described herein. For example, the communications manager 1020 may include an SPS configuration component 1025, a scheduling request receiving component 1030, a DCI transmission component 1035, a scheduling request masking component 1040, a delay threshold configuration component 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The SPS configuration component 1025 may be configured as or otherwise support a means for transmitting a first control message indicating a set of scheduled uplink communications, the set of scheduled uplink communications including a set of transmission opportunities for transmitting one or more uplink messages. The scheduling request receiving component 1030 may be configured as or otherwise support a means for receiving a scheduling request based on a first duration between an availability of uplink data and a transmission opportunity of the set of transmission opportunities being greater than a second duration. The DCI transmission component 1035 may be configured as or otherwise support a means for transmitting, in response to the scheduling request, downlink control information scheduling uplink resources for the uplink data, where the transmission of the downlink control information scheduling the uplink resources occur prior to the transmission opportunity.

In some examples, the second duration is based on a duration between the availability of the uplink data and an availability of uplink resources granted in response to a scheduling request transmission.

In some examples, the first duration is based on a first periodicity associated with the set of transmission opportunities and the second duration is based on a second periodicity associated with resources for transmitting the scheduling request.

In some examples, the second duration is based on a duration between one or more previous scheduling request transmissions and respective uplink resources scheduled in response to each of the one or more previous scheduling request transmissions.

In some examples, the second duration is based on an average duration between the one or more previous scheduling request transmissions and the respective uplink resources scheduled.

In some examples, the second duration includes a delay threshold associated with the uplink data.

In some examples, the delay threshold configuration component 1045 may be configured as or otherwise support a means for transmitting a second control message indicating a configuration of the delay threshold.

In some examples, the delay threshold includes an upper bound for a latency of the uplink data.

In some examples, the scheduling request masking component 1040 may be configured as or otherwise support a means for transmitting an indication of a scheduling request mask configured for a logical channel corresponding to the uplink data, the scheduling request being configured for the logical channel corresponding to the uplink data, where the scheduling request is received based on the scheduling request being configured for the logical channel and the first duration being greater than the second duration.

In some examples, the scheduling request masking component 1040 may be configured as or otherwise support a means for transmitting an indication of a scheduling request mask configured for a first logical channel corresponding to the uplink data, the scheduling request being configured for a second logical channel different from the first logical channel corresponding to the uplink data, where the scheduling request is received based on the scheduling request being configured for the second logical channel and the first duration being greater than the second duration.

Figure 11:
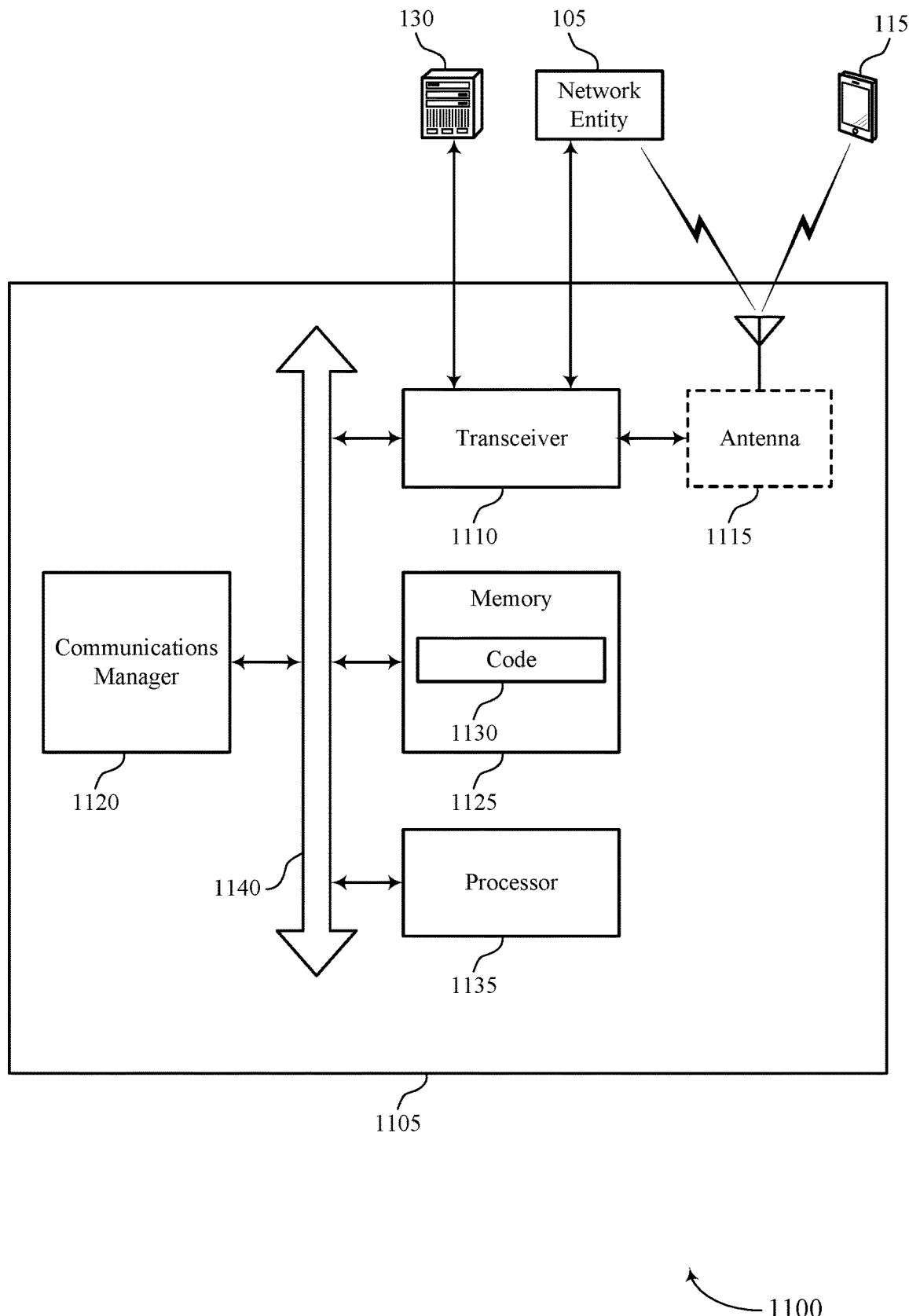
FIG. 11 shows a diagram of a system including a device that supports techniques for reducing latency of data in the presence of scheduled uplink transmissions in accordance with one or more aspects of the present disclosure.

FIG. 11 shows a diagram of a system 1100 including a device 1105 that supports techniques for reducing latency of data in the presence of scheduled uplink transmissions in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for reducing latency of data in the presence of scheduled uplink transmissions). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting a first control message indicating a set of scheduled uplink communications, the set of scheduled uplink communications including a set of transmission opportunities for transmitting one or more uplink messages. The communications manager 1120 may be configured as or otherwise support a means for receiving a scheduling request based on a first duration between an availability of uplink data and a transmission opportunity of the set of transmission opportunities being greater than a second duration. The communications manager 1120 may be configured as or otherwise support a means for transmitting, in response to the scheduling request, downlink control information scheduling uplink resources for the uplink data, where the transmission of the downlink control information scheduling the uplink resources occur prior to the transmission opportunity.

By including or configuring the communications manager 1120 in accordance with examples as described herein, the device 1105 may support techniques for improved communication reliability, reduced latency, improved user experience related to reduced latency and increased reliability, reduced power consumption, more efficient utilization of communication resources, longer battery life, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of techniques for reducing latency of data in the presence of scheduled uplink transmissions as described herein, or the processor 1135 and the memory 1125 may be otherwise configured to perform or support such operations.

Figure 12:
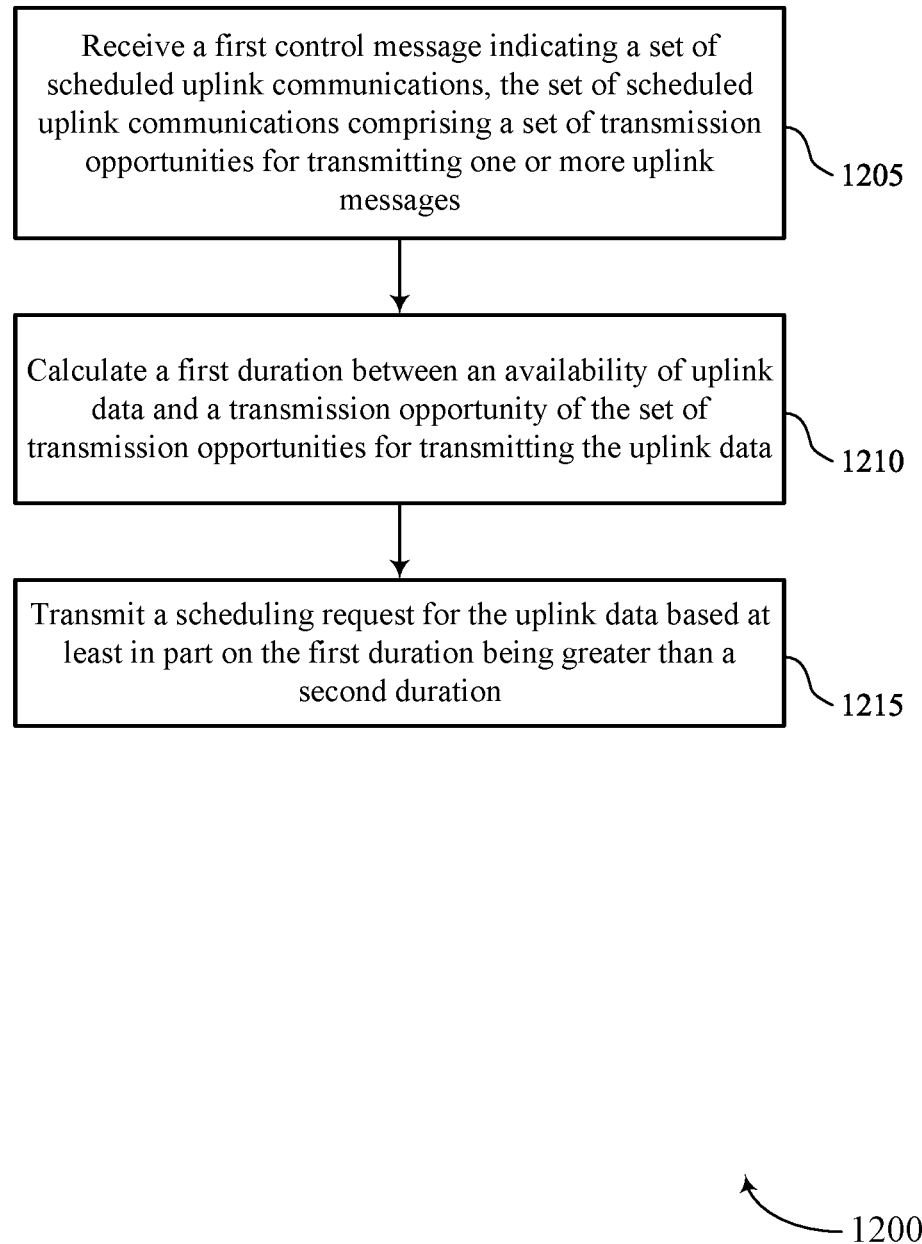
FIGS. 12 through 16 show flowcharts illustrating methods that support techniques for reducing latency of data in the presence of scheduled uplink transmissions in accordance with one or more aspects of the present disclosure.

FIG. 12 shows a flowchart illustrating a method 1200 that supports techniques for reducing latency of data in the presence of scheduled uplink transmissions in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a first control message indicating a set of scheduled uplink communications, the set of scheduled uplink communications including a set of transmission opportunities for transmitting one or more uplink messages. The operations of 1205 may be performed in accordance with examples as disclosed herein. In some examples, aspects of the operations of 1205 may be performed by an SPS configuration component 625 as described with reference to FIG. 6.

At 1210, the method may include calculating a first duration between an availability of uplink data and a transmission opportunity of the set of transmission opportunities for transmitting the uplink data. The operations of 1210 may be performed in accordance with examples as disclosed herein. In some examples, aspects of the operations of 1210 may be performed by a transmission timing calculation component 630 as described with reference to FIG. 6.

At 1215, the method may include transmitting a scheduling request for the uplink data based on the first duration being greater than a second duration. The operations of 1215 may be performed in accordance with examples as disclosed herein. In some examples, aspects of the operations of 1215 may be performed by a scheduling request transmission component 635 as described with reference to FIG. 6.

Figure 13:
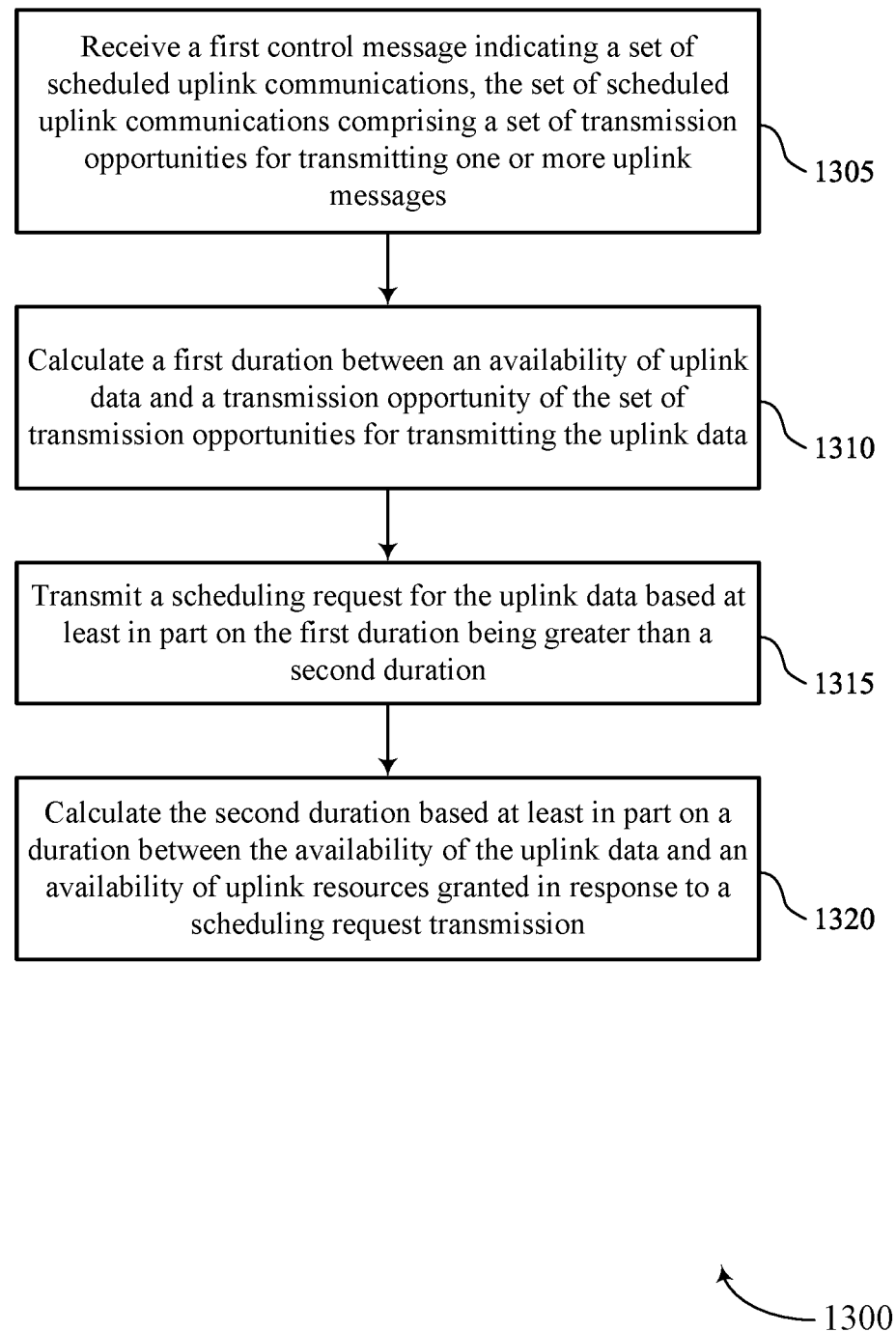

FIG. 13 shows a flowchart illustrating a method 1300 that supports techniques for reducing latency of data in the presence of scheduled uplink transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a first control message indicating a set of scheduled uplink communications, the set of scheduled uplink communications including a set of transmission opportunities for transmitting one or more uplink messages. The operations of 1305 may be performed in accordance with examples as disclosed herein. In some examples, aspects of the operations of 1305 may be performed by an SPS configuration component 625 as described with reference to FIG. 6.

At 1310, the method may include calculating a first duration between an availability of uplink data and a transmission opportunity of the set of transmission opportunities for transmitting the uplink data. The operations of 1310 may be performed in accordance with examples as disclosed herein. In some examples, aspects of the operations of 1310 may be performed by a transmission timing calculation component 630 as described with reference to FIG. 6.

At 1315, the method may include transmitting a scheduling request for the uplink data based on the first duration being greater than a second duration. The operations of 1315 may be performed in accordance with examples as disclosed herein. In some examples, aspects of the operations of 1315 may be performed by a scheduling request transmission component 635 as described with reference to FIG. 6.

At 1320, the method may include calculating the second duration based on a duration between the availability of the uplink data and an availability of uplink resources granted in response to a scheduling request transmission. The operations of 1320 may be performed in accordance with examples as disclosed herein. In some examples, aspects of the operations of 1320 may be performed by a transmission timing calculation component 630 as described with reference to FIG. 6.

Figure 14:
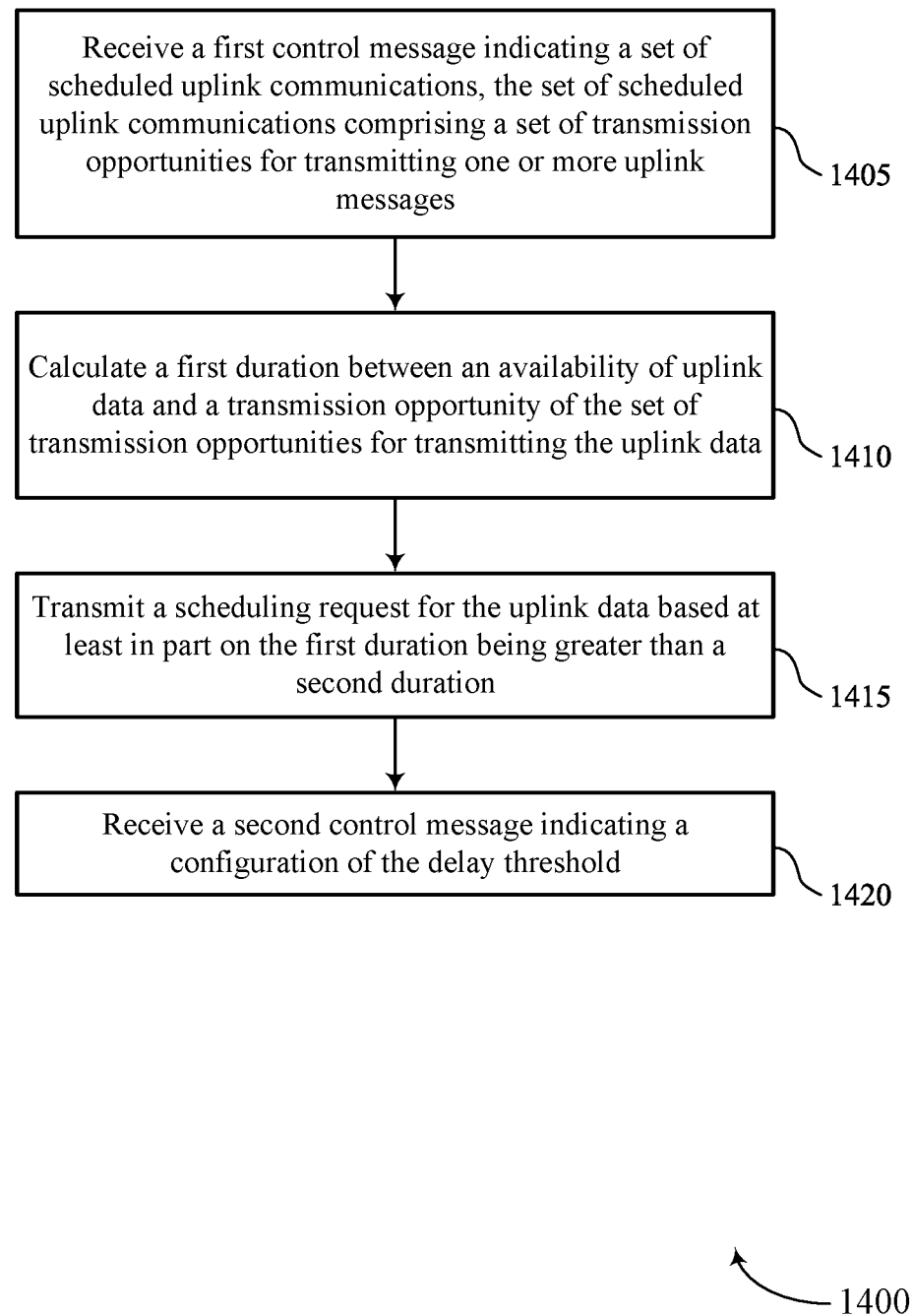

FIG. 14 shows a flowchart illustrating a method 1400 that supports techniques for reducing latency of data in the presence of scheduled uplink transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a first control message indicating a set of scheduled uplink communications, the set of scheduled uplink communications including a set of transmission opportunities for transmitting one or more uplink messages. The operations of 1405 may be performed in accordance with examples as disclosed herein. In some examples, aspects of the operations of 1405 may be performed by an SPS configuration component 625 as described with reference to FIG. 6.

At 1410, the method may include calculating a first duration between an availability of uplink data and a transmission opportunity of the set of transmission opportunities for transmitting the uplink data. The operations of 1410 may be performed in accordance with examples as disclosed herein. In some examples, aspects of the operations of 1410 may be performed by a transmission timing calculation component 630 as described with reference to FIG. 6.

At 1415, the method may include transmitting a scheduling request for the uplink data based on the first duration being greater than a second duration. The operations of 1415 may be performed in accordance with examples as disclosed herein. In some examples, aspects of the operations of 1415 may be performed by a scheduling request transmission component 635 as described with reference to FIG. 6.

At 1420, the method may include receiving a second control message indicating a configuration of the delay threshold. The operations of 1420 may be performed in accordance with examples as disclosed herein. In some examples, aspects of the operations of 1420 may be performed by a delay threshold configuration component 655 as described with reference to FIG. 6.

Figure 15:
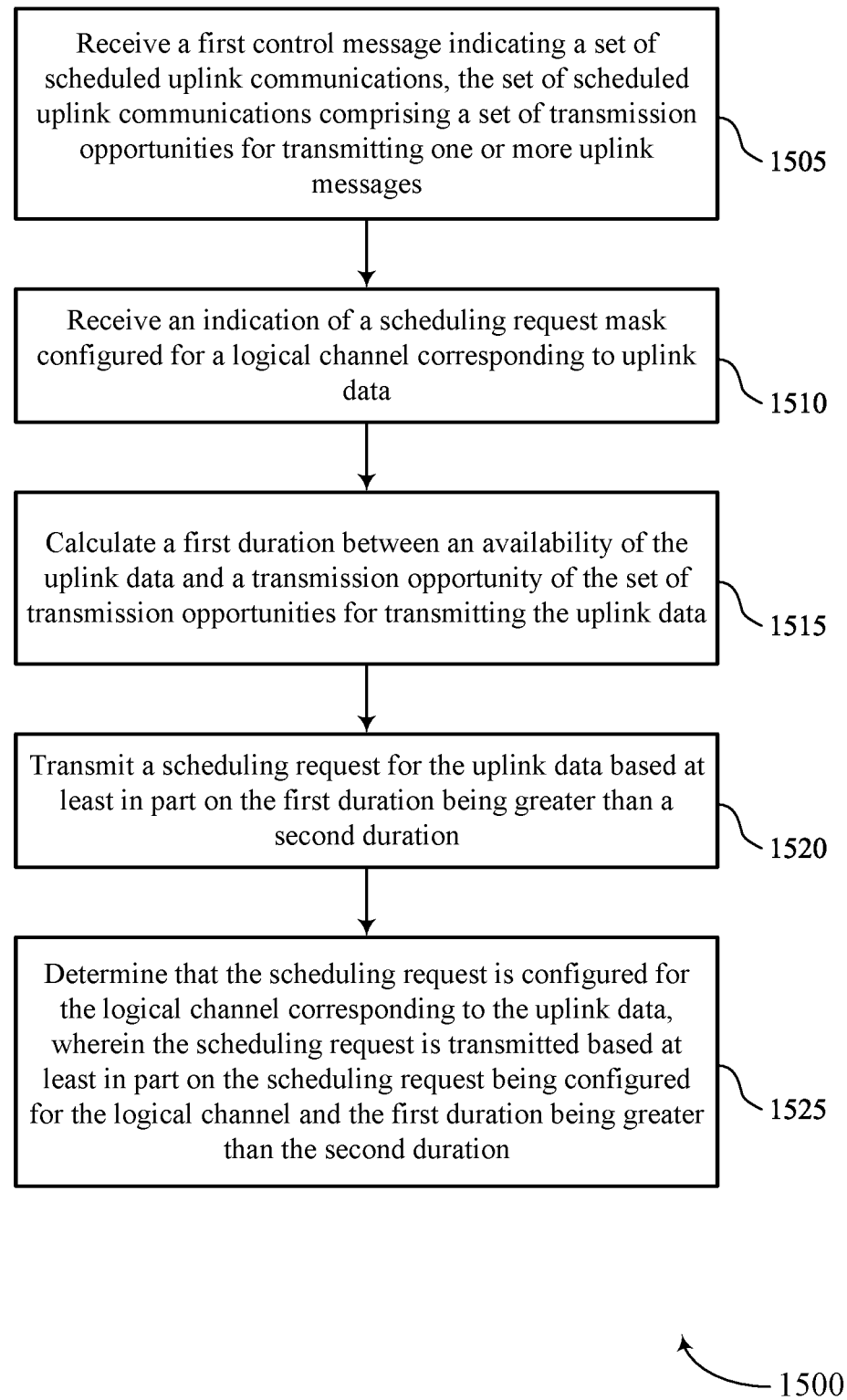

FIG. 15 shows a flowchart illustrating a method 1500 that supports techniques for reducing latency of data in the presence of scheduled uplink transmissions in accordance with one or more aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1505, the method may include receiving a first control message indicating a set of scheduled uplink communications, the set of scheduled uplink communications including a set of transmission opportunities for transmitting one or more uplink messages. The operations of 1505 may be performed in accordance with examples as disclosed herein. In some examples, aspects of the operations of 1505 may be performed by an SPS configuration component 625 as described with reference to FIG. 6.

At 1510, the method may include receiving an indication of a scheduling request mask configured for a logical channel corresponding to the uplink data. The operations of 1510 may be performed in accordance with examples as disclosed herein. In some examples, aspects of the operations of 1510 may be performed by a scheduling request masking component 640 as described with reference to FIG. 6.

At 1515, the method may include calculating a first duration between an availability of uplink data and a transmission opportunity of the set of transmission opportunities for transmitting the uplink data. The operations of 1515 may be performed in accordance with examples as disclosed herein. In some examples, aspects of the operations of 1515 may be performed by a transmission timing calculation component 630 as described with reference to FIG. 6.

At 1520, the method may include transmitting a scheduling request for the uplink data based on the first duration being greater than a second duration. The operations of 1520 may be performed in accordance with examples as disclosed herein. In some examples, aspects of the operations of 1520 may be performed by a scheduling request transmission component 635 as described with reference to FIG. 6.

At 1525, the method may include determining that the scheduling request is configured for the logical channel corresponding to the uplink data, where the scheduling request is transmitted based on the scheduling request being configured for the logical channel and the first duration being greater than the second duration. The operations of 1525 may be performed in accordance with examples as disclosed herein. In some examples, aspects of the operations of 1525 may be performed by a scheduling request transmission component 635 as described with reference to FIG. 6.

Figure 16:
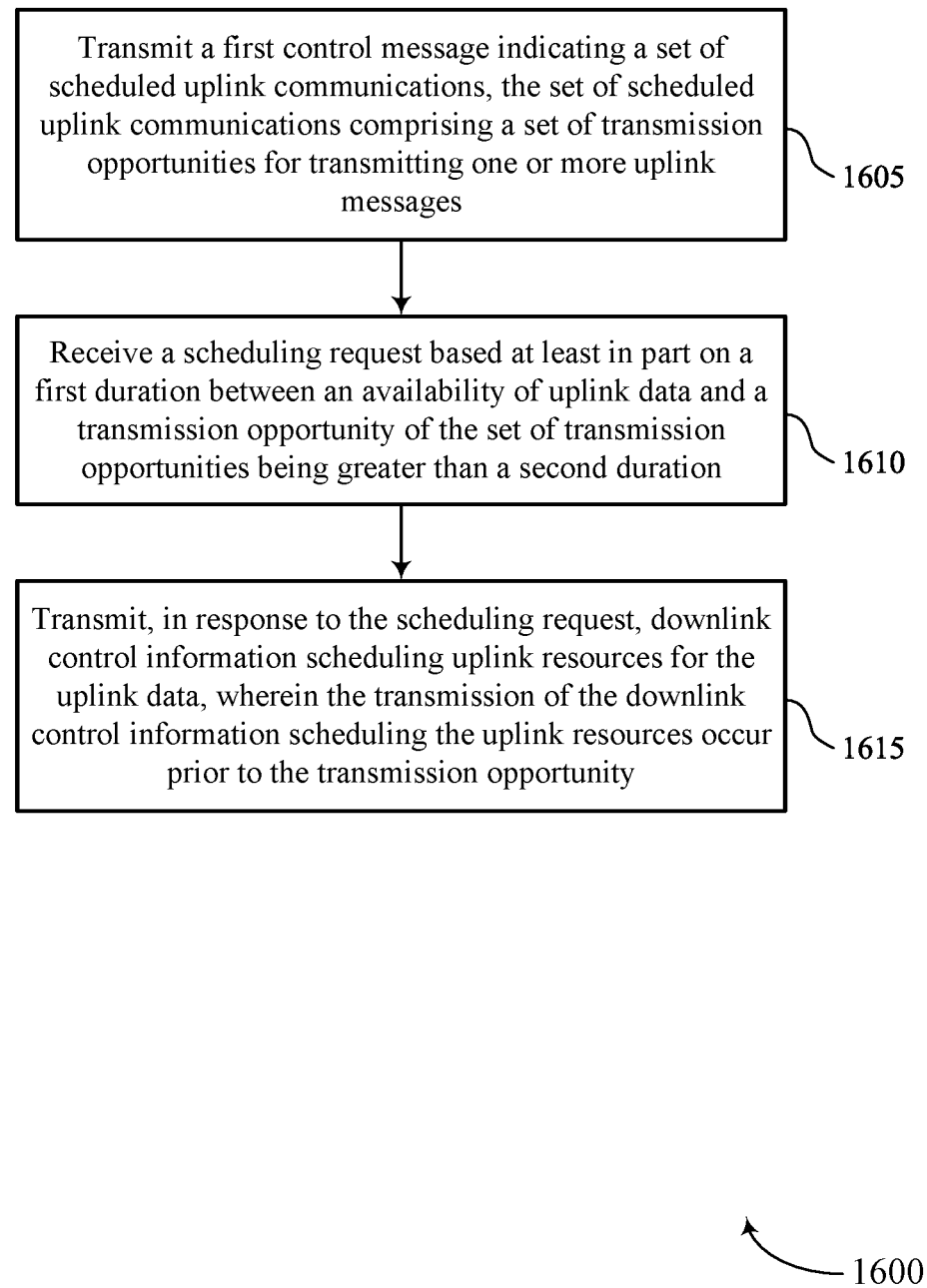

FIG. 16 shows a flowchart illustrating a method 1600 that supports techniques for reducing latency of data in the presence of scheduled uplink transmissions in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a first control message indicating a set of scheduled uplink communications, the set of scheduled uplink communications including a set of transmission opportunities for transmitting one or more uplink messages. The operations of 1605 may be performed in accordance with examples as disclosed herein. In some examples, aspects of the operations of 1605 may be performed by an SPS configuration component 1025 as described with reference to FIG. 10.

At 1610, the method may include receiving a scheduling request based on a first duration between an availability of uplink data and a transmission opportunity of the set of transmission opportunities being greater than a second duration. The operations of 1610 may be performed in accordance with examples as disclosed herein. In some examples, aspects of the operations of 1610 may be performed by a scheduling request receiving component 1030 as described with reference to FIG. 10.

At 1615, the method may include transmitting, in response to the scheduling request, downlink control information scheduling uplink resources for the uplink data, where the transmission of the downlink control information scheduling the uplink resources occur prior to the transmission opportunity. The operations of 1615 may be performed in accordance with examples as disclosed herein. In some examples, aspects of the operations of 1615 may be performed by a DCI transmission component 1035 as described with reference to FIG. 10.

The following provides an overview of aspects of the present disclosure:

Aspect 1: A method for wireless communication at a UE, comprising: receiving a first control message indicating a set of scheduled uplink communications, the set of scheduled uplink communications comprising a set of transmission opportunities for transmitting one or more uplink messages; calculating a first duration between an availability of uplink data and a transmission opportunity of the set of transmission opportunities for transmitting the uplink data; and transmitting a scheduling request for the uplink data based at least in part on the first duration being greater than a second duration.

Aspect 2: The method of aspect 1, further comprising: calculating the second duration based at least in part on a duration between the availability of the uplink data and an availability of uplink resources granted in response to a scheduling request transmission.

Aspect 3: The method of aspect 2, wherein calculating the first duration comprises: calculating the first duration based at least in part on a first periodicity associated with the set of transmission opportunities, and wherein calculating the second duration comprises: calculating the second duration based at least in part on a second periodicity associated with resources for transmitting the scheduling request.

Aspect 4: The method of any of aspects 2 through 3, wherein calculating the second duration comprises: calculating the second duration based at least in part on a duration between one or more previous scheduling request transmissions and respective uplink resources scheduled in response to each of the one or more previous scheduling request transmissions.

Aspect 5: The method of aspect 4, wherein the second duration is based at least in part on an average duration between the one or more previous scheduling request transmissions and the respective uplink resources scheduled.

Aspect 6: The method of any of aspects 1 through 5, wherein the second duration comprises a delay threshold associated with the uplink data.

Aspect 7: The method of aspect 6, further comprising: receiving a second control message indicating a configuration of the delay threshold.

Aspect 8: The method of any of aspects 6 through 7, wherein the delay threshold comprises an upper bound for a latency of the uplink data.

Aspect 9: The method of any of aspects 1 through 8, wherein the set of scheduled uplink communications comprises a set of semi-persistently scheduled uplink communications, a set of pre-scheduled uplink communications, or both.

Aspect 10: The method of any of aspects 1 through 9, further comprising: receiving an indication of a scheduling request mask configured for a logical channel corresponding to the uplink data; and determining that the scheduling request is configured for the logical channel corresponding to the uplink data, wherein the scheduling request is transmitted based at least in part on the scheduling request being configured for the logical channel and the first duration being greater than the second duration.

Aspect 11: The method of any of aspects 1 through 10, further comprising: receiving an indication of a scheduling request mask configured for a first logical channel corresponding to the uplink data; and determining that the scheduling request is configured for a second logical channel different from the first logical channel corresponding to the uplink data, wherein the scheduling request is transmitted based at least in part on the scheduling request being configured for the second logical channel and the first duration being greater than the second duration.

Aspect 12: The method of any of aspects 1 through 11, further comprising: receiving, in response to the scheduling request, DCI scheduling uplink resources for the uplink data on a first logical channel, wherein receiving the DCI scheduling the uplink resources occurs prior to the transmission opportunity; and transmitting the uplink data from the first logical channel using the uplink resources.

Aspect 13: A method for wireless communication at a network entity, comprising: transmitting a first control message indicating a set of scheduled uplink communications, the set of scheduled uplink communications comprising a set of transmission opportunities for transmitting one or more uplink messages; receiving a scheduling request based at least in part on a first duration between an availability of uplink data and a transmission opportunity of the set of transmission opportunities being greater than a second duration; and transmitting, in response to the scheduling request, DCI scheduling uplink resources for the uplink data, wherein the transmission of the DCI scheduling the uplink resources occur prior to the transmission opportunity.

Aspect 14: The method of aspect 13, wherein the second duration is based at least in part on a duration between the availability of the uplink data and an availability of uplink resources granted in response to a scheduling request transmission.

Aspect 15: The method of any of aspects 13 through 14, wherein the first duration is based at least in part on a first periodicity associated with the set of transmission opportunities and the second duration is based at least in part on a second periodicity associated with resources for transmitting the scheduling request.

Aspect 16: The method of any of aspects 13 through 15, wherein the second duration is based at least in part on a duration between one or more previous scheduling request transmissions and respective uplink resources scheduled in response to each of the one or more previous scheduling request transmissions.

Aspect 17: The method of aspect 16, wherein the second duration is based at least in part on an average duration between the one or more previous scheduling request transmissions and the respective uplink resources scheduled.

Aspect 18: The method of any of aspects 13 through 17, wherein the second duration comprises a delay threshold associated with the uplink data.

Aspect 19: The method of aspect 18, further comprising: transmitting a second control message indicating a configuration of the delay threshold.

Aspect 20: The method of any of aspects 18 through 19, wherein the delay threshold comprises an upper bound for a latency of the uplink data.

Aspect 21: The method of any of aspects 13 through 20, wherein the set of scheduled uplink communications comprise a set of semi-persistently scheduled uplink communications, a set of pre-scheduled uplink communications, or both.

Aspect 22: The method of any of aspects 13 through 21, further comprising: transmitting an indication of a scheduling request mask configured for a logical channel corresponding to the uplink data, the scheduling request being configured for the logical channel corresponding to the uplink data, wherein the scheduling request is received based at least in part on the scheduling request being configured for the logical channel and the first duration being greater than the second duration.

Aspect 23: The method of aspect 22, further comprising: transmitting an indication of a scheduling request mask configured for a first logical channel corresponding to the uplink data, the scheduling request being configured for a second logical channel different from the first logical channel corresponding to the uplink data, wherein the scheduling request is received based at least in part on the scheduling request being configured for the second logical channel and the first duration being greater than the second duration.

Aspect 24: An apparatus for wireless communication at a UE, comprising a processor; memory coupled with the processor; and instructions stored in the memory and executable by the processor to cause the apparatus to perform a method of any of aspects 1 through 12.

Aspect 25: An apparatus for wireless communication at a UE, comprising at least one means for performing a method of any of aspects 1 through 12.

Aspect 26: A non-transitory computer-readable medium storing code for wireless communication at a UE, the code comprising instructions executable by a processor to perform a method of any of aspects 1 through 12.

Aspect 27: An apparatus for wireless communication at a network entity, comprising a processor; memory coupled with the processor; and instructions stored in the memory and executable by the processor to cause the apparatus to perform a method of any of aspects 13 through 23.

Aspect 28: An apparatus for wireless communication at a network entity, comprising at least one means for performing a method of any of aspects 13 through 23.

Aspect 29: A non-transitory computer-readable medium storing code for wireless communication at a network entity, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first control message indicating a set of scheduled uplink communications, the set of scheduled uplink communications comprising a set of transmission opportunities for transmitting one or more uplink messages;
   calculating a first duration between an availability of uplink data and a transmission opportunity of the set of transmission opportunities for transmitting the uplink data; and
   transmitting a scheduling request for the uplink data based at least in part on the first duration being greater than a second duration.

2. The method of claim 1, further comprising:
   calculating the second duration based at least in part on a duration between the availability of the uplink data and an availability of uplink resources granted in response to a scheduling request transmission.

3. The method of claim 2, wherein calculating the first duration comprises:
   calculating the first duration based at least in part on a first periodicity associated with the set of transmission opportunities, and wherein calculating the second duration comprises:
   calculating the second duration based at least in part on a second periodicity associated with resources for transmitting the scheduling request.

4. The method of claim 2, wherein calculating the second duration comprises:
   calculating the second duration based at least in part on a duration between one or more previous scheduling request transmissions and respective uplink resources scheduled in response to each of the one or more previous scheduling request transmissions.

5. The method of claim 4, wherein the second duration is based at least in part on an average duration between the one or more previous scheduling request transmissions and the respective uplink resources scheduled.

6. The method of claim 1, wherein the second duration comprises a delay threshold associated with the uplink data.

7. The method of claim 6, further comprising:
   receiving a second control message indicating a configuration of the delay threshold.

8. The method of claim 6, wherein the delay threshold comprises an upper bound for a latency of the uplink data.

9. The method of claim 1, wherein the set of scheduled uplink communications comprises a set of semi-persistently scheduled uplink communications, a set of pre-scheduled uplink communications, or both.

10. The method of claim 1, further comprising:
    receiving an indication of a scheduling request mask configured for a logical channel corresponding to the uplink data; and
    determining that the scheduling request is configured for the logical channel corresponding to the uplink data, wherein the scheduling request is transmitted based at least in part on the scheduling request being configured for the logical channel and the first duration being greater than the second duration.

11. The method of claim 1, further comprising:
    receiving an indication of a scheduling request mask configured for a first logical channel corresponding to the uplink data; and
    determining that the scheduling request is configured for a second logical channel different from the first logical channel corresponding to the uplink data, wherein the scheduling request is transmitted based at least in part on the scheduling request being configured for the second logical channel and the first duration being greater than the second duration.

12. The method of claim 1, further comprising:
    receiving, in response to the scheduling request, downlink control information scheduling uplink resources for the uplink data on a first logical channel, wherein receiving the downlink control information scheduling the uplink resources occurs prior to the transmission opportunity; and
    transmitting the uplink data from the first logical channel using the uplink resources.

13. A method for wireless communication at a network entity, comprising:
    transmitting a first control message indicating a set of scheduled uplink communications, the set of scheduled uplink communications comprising a set of transmission opportunities for transmitting one or more uplink messages;
    receiving a scheduling request based at least in part on a first duration between an availability of uplink data and a transmission opportunity of the set of transmission opportunities being greater than a second duration; and
    transmitting, in response to the scheduling request, downlink control information scheduling uplink resources for the uplink data, wherein transmission of the downlink control information scheduling the uplink resources occur prior to the transmission opportunity.

14. The method of claim 13, wherein the second duration is based at least in part on a duration between the availability of the uplink data and an availability of uplink resources granted in response to a scheduling request transmission.

15. The method of claim 13, wherein the first duration is based at least in part on a first periodicity associated with the set of transmission opportunities and the second duration is based at least in part on a second periodicity associated with resources for transmitting the scheduling request.

16. The method of claim 13, wherein the second duration is based at least in part on a duration between one or more previous scheduling request transmissions and respective uplink resources scheduled in response to each of the one or more previous scheduling request transmissions.

17. The method of claim 16, wherein the second duration is based at least in part on an average duration between the one or more previous scheduling request transmissions and the respective uplink resources scheduled.

18. The method of claim 13, wherein the second duration comprises a delay threshold associated with the uplink data.

19. The method of claim 18, further comprising:
transmitting a second control message indicating a configuration of the delay threshold.

20. The method of claim 18, wherein the delay threshold comprises an upper bound for a latency of the uplink data.

21. The method of claim 13, wherein the set of scheduled uplink communications comprise a set of semi-persistently scheduled uplink communications, a set of pre-scheduled uplink communications, or both.

22. The method of claim 13, further comprising:
transmitting an indication of a scheduling request mask configured for a logical channel corresponding to the uplink data, the scheduling request being configured for the logical channel corresponding to the uplink data, wherein the scheduling request is received based at least in part on the scheduling request being configured for the logical channel and the first duration being greater than the second duration.

23. The method of claim 13, further comprising:
transmitting an indication of a scheduling request mask configured for a first logical channel corresponding to the uplink data, the scheduling request being configured for a second logical channel different from the first logical channel corresponding to the uplink data, wherein the scheduling request is received based at least in part on the scheduling request being configured for the second logical channel and the first duration being greater than the second duration.

24. An apparatus for wireless communication at a user equipment (UE), comprising:
one or more processors;
one or more memories coupled with the one or more processors; and
instructions stored in the one or more memories and executable by the one or more processors to cause the UE to:
receive a first control message indicating a set of scheduled uplink communications, the set of scheduled uplink communications comprising a set of transmission opportunities for transmitting one or more uplink messages;
calculate a first duration between an availability of uplink data and a transmission opportunity of the set of transmission opportunities for transmitting the uplink data; and
transmit a scheduling request for the uplink data based at least in part on the first duration being greater than a second duration.

25. The apparatus of claim 24, wherein the instructions are further executable by the one or more processors to cause the UE to:
calculate the second duration based at least in part on a duration between the availability of the uplink data and an availability of uplink resources granted in response to a scheduling request transmission.

26. The apparatus of claim 25, wherein the instructions to calculate the first duration are executable by the one or more processors to cause the UE to:
calculate the first duration based at least in part on a first periodicity associated with the set of transmission opportunities, and wherein calculating the second duration comprises:
calculate the second duration based at least in part on a second periodicity associated with resources for transmitting the scheduling request.

27. The apparatus of claim 25, wherein the instructions to calculate the second duration are executable by the one or more processors to cause the UE to:
calculate the second duration based at least in part on a duration between one or more previous scheduling request transmissions and respective uplink resources scheduled in response to each of the one or more previous scheduling request transmissions.

28. The apparatus of claim 27, wherein the second duration is based at least in part on an average duration between the one or more previous scheduling request transmissions and the respective uplink resources scheduled.

29. The apparatus of claim 25, wherein the second duration comprises a delay threshold associated with the uplink data.

30. An apparatus for wireless communication at a network entity, comprising:
one or more processors;
one or more memories coupled with the one or more processors; and
instructions stored in the one or more memories and executable by the one or more processors to cause the network entity to:
transmit a first control message indicating a set of scheduled uplink communications, the set of scheduled uplink communications comprising a set of transmission opportunities for transmitting one or more uplink messages;
receive a scheduling request based at least in part on a first duration between an availability of uplink data and a transmission opportunity of the set of transmission opportunities being greater than a second duration; and
transmit, in response to the scheduling request, downlink control information scheduling uplink resources for the uplink data, wherein transmission of the downlink control information scheduling the uplink resources occur prior to the transmission opportunity.

* * * * *